(12) United States Patent
Lee

(10) Patent No.: US 9,927,096 B2
(45) Date of Patent: Mar. 27, 2018

(54) DISPLAY ASSEMBLY AND DISPLAY DEVICE USING THE SAME

(71) Applicant: SAMSUNG ELECTRONICS CO., LTD., Suwon-si, Gyeonggi-do (KR)

(72) Inventor: Kye Hoon Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 206 days.

(21) Appl. No.: 14/936,797

(22) Filed: Nov. 10, 2015

(65) Prior Publication Data

US 2016/0377263 A1 Dec. 29, 2016

(30) Foreign Application Priority Data

Jun. 23, 2015 (KR) .................. 10-2015-0088968

(51) Int. Cl.
- *G02F 1/1335* (2006.01)
- *F21V 9/16* (2006.01)
- *F21V 8/00* (2006.01)

(52) U.S. Cl.
CPC .............. *F21V 9/16* (2013.01); *G02B 6/005* (2013.01); *G02B 6/0068* (2013.01); *G02B 6/0086* (2013.01); *G02F 1/133606* (2013.01); *G02F 1/133617* (2013.01); *G02F 1/133621* (2013.01); *G02B 6/0031* (2013.01); *G02B 6/0073* (2013.01); *G02F 2001/133614* (2013.01); *G02F 2202/108* (2013.01); *G09G 2300/0439* (2013.01); *G09G 2320/028* (2013.01)

(58) Field of Classification Search
CPC .......... F21V 9/16; G02B 6/005; G02B 6/0068

USPC ......................................................... 349/61
See application file for complete search history.

(56) References Cited

U.S. PATENT DOCUMENTS

| 4,909,604 | A | * | 3/1990 | Kobayashi | ................ | F21V 7/00 |
| | | | | | | 349/64 |
| 8,593,590 | B2 | | 11/2013 | Jung | | |
| 2003/0026108 | A1 | * | 2/2003 | Higuchi | ............... | G02B 6/0053 |
| | | | | | | 362/558 |
| 2006/0274226 | A1 | | 12/2006 | Im et al. | | |
| 2007/0007881 | A1 | | 1/2007 | Kim et al. | | |
| 2007/0024186 | A1 | | 2/2007 | Chen et al. | | |
| 2010/0118045 | A1 | | 5/2010 | Brown Elliott et al. | | |

(Continued)

FOREIGN PATENT DOCUMENTS

| KR | 10-2010-0089606 | 8/2010 |
| KR | 10-2012-0092888 | 8/2012 |
| KR | 10-2015-0061968 | 6/2015 |

OTHER PUBLICATIONS

Extended European Search Report dated Oct. 27, 2016 in counterpart European Patent Application No. 15193914.7.

(Continued)

*Primary Examiner* — Lucy Chien

(74) *Attorney, Agent, or Firm* — Nixon & Vanderhye P.C.

(57) ABSTRACT

A display assembly and display device using the same is disclosed. The display assembly includes a light source for outputting blue light; a quantum dot converter for converting the blue light output from the light source to output at least one of red light and green light; a light transmitter for transmitting the blue light output from the light source by scattering all or part of the blue light; and a substrate on which the quantum converter and the light transmitter are arranged.

20 Claims, 20 Drawing Sheets

(56) References Cited

U.S. PATENT DOCUMENTS

| | | |
|---|---|---|
| 2011/0152538 A1* | 6/2011 | Mae .................. C09B 57/06 |
| | | 548/437 |
| 2012/0113672 A1 | 5/2012 | Dubrow et al. |
| 2013/0010229 A1 | 1/2013 | Shin et al. |
| 2013/0215136 A1 | 8/2013 | Jiao et al. |
| 2014/0192078 A1 | 7/2014 | Gilbert |
| 2014/0192294 A1* | 7/2014 | Chen .................. F21V 9/08 |
| | | 349/69 |
| 2014/0204128 A1 | 7/2014 | Jiang |
| 2014/0293186 A1 | 10/2014 | Ek et al. |
| 2015/0048348 A1 | 2/2015 | Huang et al. |

OTHER PUBLICATIONS

Search Report dated Mar. 23, 2016 in counterpart International Application No. PCT/KR2015/011273.

\* cited by examiner

3t : 4t,5t
3i : 4i,5i

T:30, R:21, G:22

40 : 41~44

DISPLAY ASSEMBLY AND DISPLAY DEVICE USING THE SAME

CROSS-REFERENCE TO RELATED APPLICATION(S)

This application is based on and claims priority under 35 U.S.C. § 119 to a Korean patent application filed on Jun. 23, 2015 in the Korean Intellectual Property Office and assigned Serial No. 10-2015-0088968, the disclosure of which is incorporated by reference herein in its entirety.

BACKGROUND

1. Field

The disclosure relates to a display assembly and display device using the same.

2. Description of Related Art

Display devices are types of output devices for displaying obtained or stored electrical information by converting the electrical information to visual information, and are used in various home or business applications.

Display devices may include various devices and systems such as e.g., monitor devices connectable to computer devices, laptop computer devices, smartphones, tablet Personal Computers (PCs), Personal Digital Assistants (PDAs), mobile stations such as cellular phones, telematics terminals, Wibro terminals, Audio Video and Navigation (AVN) terminals, ordinary televisions (TVs), Internet Protocol TVs (IPTVs), various audio/video systems, home theater systems, etc.

The display device may be implemented using various types of displays which may include cathode-ray tubes, Light Emitting Diodes (LEDs), Organic LEDs (OLEDs), Active-Matrix OLEDs, liquid crystals or electronic paper, etc.

SUMMARY

The disclosure provides an example display assembly and display device using the same, which may improve color viewing-angle properties by preventing and/or reducing occurrence of color viewing-angle inferiority due to relatively narrow viewing angle of blue light as compared to red light and green light. Another aspect of the disclosure is to provide an example display assembly and display device using the same, which may enhance overall luminance by preventing and/or reducing white balance from being incorrectly performed when luminance of red light and green light is relatively low as compared to blue light, or by preventing and/or reducing the entire luminance of light output after the white balance from being lowered.

In accordance with an aspect of the disclosure, an example display assembly is provided. The example display assembly includes a light source for outputting blue light; a quantum dot converter for converting the blue light output from the light source to output at least one of red light and green light; a light transmitter for transmitting the blue light output from the light source by scattering all or part of the blue light; and a substrate on which the quantum dot converter and the light transmitter are arranged.

The quantum dot converter may, for example, include a first output face from which at least one of red light and green light is output, and the light transmitter may, for example, include a second output face from which the blue light is output, wherein an area of the first output face may be relatively larger than an area of the second output face.

The quantum dot converter may, for example, include at least one of at least one red light quantum dot element for converting blue light output from the light source to output red light and at least one green light quantum dot element for converting blue light output from the light source to output green light.

The at least one red light quantum dot element may, for example, include a third output face from which red light is output, and the at least one green light quantum dot element may include a fourth output face from which green light is output, wherein at least one of an area of the third output face and an area of the fourth output face is larger than an area of the second output face of the light transmitter.

The at least one red light quantum dot element, the at least one green light quantum dot element, and the light transmitter may be arranged on the substrate in a predetermined pattern.

At least one of the at least one red light quantum dot element and the at least one green light quantum dot element may be arranged to be on more of the substrate than the light transmitter.

The substrate may include unit sections in which the at least one red light quantum dot element, the at least one green light quantum dot element, and the light transmitter are located.

A single unit section may include a plurality of sub-sections, and the light transmitter may be located in at least one of the sub-sections while at least one of the at least one red light quantum dot element and the at least one green light quantum dot element may be located in the other sub-sections.

At least one of the at least one red light quantum dot element and the at least one green light quantum dot element may be located in more sub-sections than the light transmitter.

The light source may, for example, include multiple light sources, and the multiple light sources may irradiate blue light to the at least one red light quantum dot element, the at least one green light quantum dot element, and light transmitter, respectively.

The display assembly may further include a light guide plate, upon which light output from the light source is laterally incident and from which the incident light is output through a output face, and the light output from the light guide plate may be incident upon the quantum dot converter and the light transmitter.

The light source may be installed to face the substrate around the quantum dot converter and the light transmitter.

The light transmitter may include a main body formed of a light transmitting material, and at least one scattering particle that is arranged inside the main body for scattering incident blue light.

The at least one scattering particle may include at least one of zinc oxide, titanium oxide, and silicon oxide.

The light transmitting material may include at least one of natural resins, synthetic resins, and glass.

In accordance with another aspect of the disclosure, an example display device is provided. The display device includes a light source for outputting blue light; and a quantum dot sheet on which at least one red light quantum dot element for converting the blue light to output red light, at least one green light quantum dot element for converting the blue light to output green light, and at least one light transmitter for transmitting the blue light by scattering all or part of the blue light and outputting the scattered light are arranged.

An output face of at least one of the at least one red light quantum dot element and the at least one green light quantum dot element may be larger than an output face of the at least one light transmitter.

The quantum dot sheet may include at least one of the at least one red light quantum dot element and the at least one green light quantum dot element wherein there are more quantum dot elements than light transmitters.

The display device may further include a liquid crystal layer, and the light source may be arranged to face the quantum dot sheet with respect to the liquid crystal layer.

The display device may further include a light guide plate, upon which the blue light is laterally incident and from which the incident light is output through an output face, and the light output through the output face may be incident upon the quantum dot sheet.

In accordance with another aspect of the disclosure, an example display device is provided. The display device includes a plurality of light sources for outputting blue light; at least one red light quantum dot element installed to correspond to at least one first light source among the plurality of light sources for converting the blue light to output red light; at least one green light quantum dot element installed to correspond to at least one second light source among the plurality of light sources for converting the blue light to output green light; and at least one light transmitter installed to correspond to at least one third light source among the plurality of light sources for transmitting the blue light by scattering all or part of the blue light and outputting the scattered light.

An output face of at least one of the at least one red light quantum dot element and the at least one green light quantum dot element may be larger than an output face of the at least one light transmitter.

The number of at least one of the at least one red light quantum dot element and the at least one green light quantum dot element may be relatively greater than the number of the light transmitter.

Other aspects, advantages, and salient features of the disclosure will become apparent to those skilled in the art from the following detailed description, which, taken in conjunction with the annexed drawings, discloses examples of the disclosure.

BRIEF DESCRIPTION OF THE DRAWINGS

The above and other features and advantages of the disclosure will become more apparent from the following detailed description taken in conjunction with the attached drawings in which like reference numerals refer to like elements, and wherein.

Throughout the drawings, like reference numerals will be understood to refer to like parts, components, and structures.

DETAILED DESCRIPTION

Various examples of a display assembly will now be described with reference to FIGS. 1 to 13.

Figure 1:
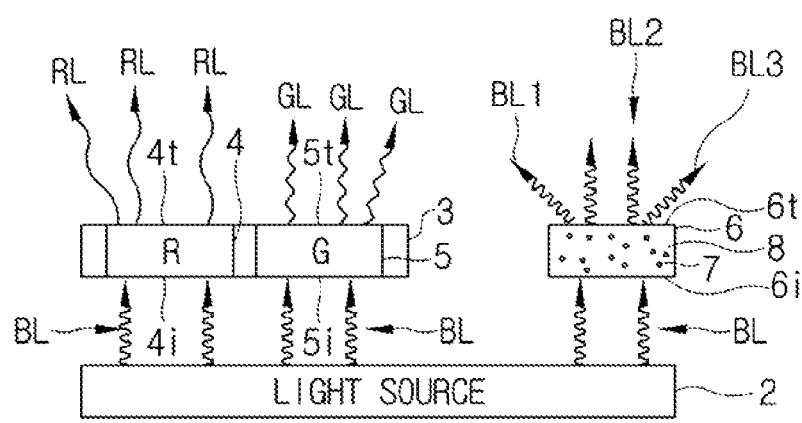
FIG. 1 illustrates an example a display assembly.
Figure 2:
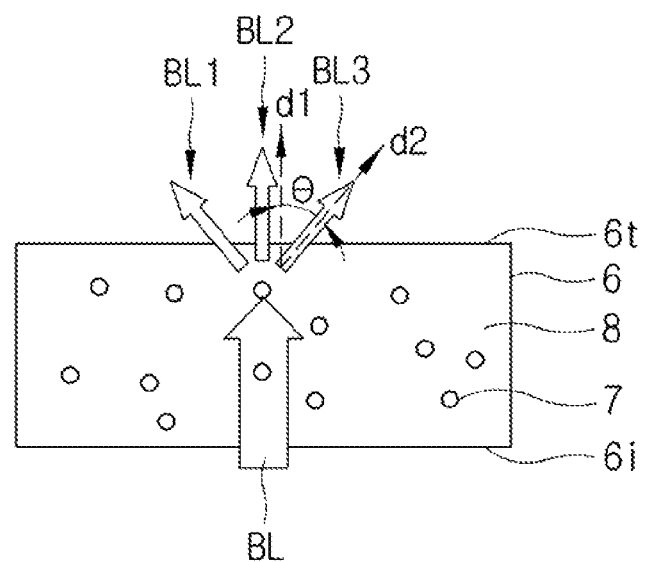
FIG. 2 illustrates an example structure of a light transmitter.

FIG. 1 illustrates an example display assembly, and FIG. 2 illustrates an example detailed structure of a light transmitter.

Referring to FIG. 1, a display assembly 1 may include a light source 2, a quantum dot converter 3, and a light transmitter 6.

The light source 2 produces light and irradiates the light onto the quantum converter 3 and light transmitter 6. The light source 2 may produce light with an intensity or brightness corresponding to power applied from the outside and irradiate the light onto the quantum dot converter 3 and light transmitter 6. The light produced by the light source 2 may reflect off a separate reflector (not shown) or aperture (not shown) to proceed toward the quantum dot converter 3 and light transmitter 6.

The light source 2 may produce light of a certain color, which may, for example, be blue light (BL) with a short wavelength in an example. The BL irradiated onto the quantum dot converter 3 is converted to red light (RL) or green light (GL) and emitted out. The BL irradiated onto the light transmitter 6 is scattered inside the light transmitter 6 and then emitted out.

The display assembly 1 may include only a single light source 2 or a plurality of light sources 2. In the latter case, the light source 2 may be individually arranged for a red light quantum dot element 4 and a green light quantum dot element 5 of the quantum dot converter 3, and the light transmitter 6. For example, the number of the light source 2 may be arranged in the display assembly 1 to be as many as the number of the red light quantum dot element 4, green light quantum dot element 5, and light transmitter 6.

The light source 2 may, for example, be implemented using an incandescent light bulb, halogen lamp, fluorescent lamp, natrium lamp, mercury lamp, fluorescent-mercury lamp, xenon lamp, arc light lamp, neon tube lamp, Electroluminescent (EL) lamp, Light Emitting Diode (LED)

lamp, or the like, and it will be understood that many different lighting devices that may produce and irradiate light of a certain color such as blue may be used as the light source 2.

The quantum dot converter 3 may use a Quantum Dot (QD) to convert a color of light emitted from the light source 2 and output light of a different color. For example, the quantum dot converter 3 may convert incident blue light (BL) to red light (RL) or green light (GL) and emit the RL or GL.

The QD refers, for example, to a semiconductor crystal made of an aggregation of hundreds to thousands of atoms, which may be e.g., a few to tens of nanometers in size. Because the QD is very small in size, a quantum confinement effect occurs. The quantum confinement effect refers to an effect in which an electron in a very small particle contributes to a discontinuous energy state due to an outer wall of the particle, for example, as the size of space in the particle decreases, the energy level of the electron becomes relatively high and the energy band gap becomes larger. Due to this quantum confinement effect, the QD may produce light of a wide range of wavelengths when the light, such as ultraviolet rays or visible rays is incident upon the QD. For example, the QD scatters and emits the incident light.

A wavelength of the light produced from the QD may, for example, depend on the size of the particle. For example, if the light of a wavelength having energy larger than the energy band gap is incident upon the QD, the QD is excited by absorbing the energy of the light, and is in the ground state by emitting light of a particular wavelength. For example, as the size of the QD decreases, it produces light with relatively short wavelength, e.g., blue light, and as the size of the QD increases, it produces light with relatively long wavelength, e.g., red light. Accordingly, various colors of light may be implemented depending on the size of the QD.

The quantum dot converter 3 may include a plurality of QDs that emit various colors of light according to their respective sizes. Accordingly, the quantum dot converter 3 may emit different colors of light by converting incident light.

The quantum dot converter 3 may have one face 3i (hereinafter, referred to as a first incidence face) upon which the light irradiated from the light source 2, e.g., BL, is incident and another face 3t (hereinafter, referred to as a first output face) from which light of a converted color RL or GL is emitted. The first incidence face 3i is located toward the light source 10 while the first output face 3t is located opposite the light source 10.

The first output face 3t may, for example, be formed to be larger in area than a second output face 6t, which is a face of the light transmitter 6 from which light is emitted. Accordingly, if an amount of light emission per unit area is uniform, the first output face 3t emits more light than the second output face 6t of the light transmitter 6 does. In the case that the first output face 3t is formed to be wider than the second output face 6t, the first incidence face 3i may also be formed to be wider than a second incidence face 6i.

The first incidence face 3i of the quantum dot converter 3 may, for example, include a third incidence face 4i and a fourth incidence face 5i, and the first output face 3t may, for example, include a third output face 4t and a fourth output face 5t, as will be described later.

The quantum dot converter 3 may include the red light quantum dot element 4 and the green light quantum dot element 5. A plurality of red light quantum dot elements 4 and green light quantum dot elements 5 may be arranged in the quantum dot converter 3.

The red light quantum dot element 4 emits red light (RL) according to the quantum confinement effect once BL is incident thereupon. The red light quantum dot element 4 includes a plurality of QDs, each being relatively larger in size than that of the green light quantum dot element 5.

When the BL is incident upon the green light quantum dot element 5, the green light quantum dot element 5 emits green light (GL) with a longer wavelength than that of the BL. The green light quantum dot element 5 includes a plurality of QDs, each being relatively smaller in size than that of the red light quantum dot element 4.

The red light quantum dot element 4 and green light quantum dot element may be formed in thin plates with a predetermined thickness, and arranged arbitrarily or in a predefined pattern. For example, the red light quantum dot element 4 may include the third incidence face 4i upon which the light irradiated from the light source 2, e.g., the BL is incident, and the third output face 4t from which the converted RL is emitted. Similarly, the green light quantum dot element 5 may include the fourth incidence face 5i upon which the light irradiated from the light source 2, e.g., the BL is incident, and the fourth output face 5t from which GL is emitted.

In some examples, the area of the third output face 4t may be the same as, or larger than the area of the second output face 6t, a face of the light transmitter 6 from which light is emitted. Similarly, the area of the third incidence face 4i may be the same as, or larger than the area of the second incidence face 6i, a face of the light transmitter 6 upon which the BL is incident. Likewise, in some examples, the area of the fourth output face 5t may be the same as, or larger than the area of the second output face 6t, a face of the light transmitter 6 from which light is emitted, and similarly, the area of the fourth incidence face 5i may be the same as, or larger than the area of the second incidence face 6i. In another example, both the areas of the third and fourth output faces 4t and 5t may be larger than the area of the second output face 6t.

If the areas of the third and fourth incidence faces 4i and 5i may each be larger than the area of the second incidence face 6i, more light e.g., BL may be incident upon the third incidence face 4i and fourth incidence face 5i than upon the second incidence face 6i, and if the areas of the third and fourth output faces 4t and 5t may each be larger than the area of the second output face 6t, more light e.g., more RL and GL may be emitted from the third output face 4t and fourth output face 5t than from the second output face 6t.

In the case that the light is converted to red light or green light in the red light quantum dot element 4 or in the green light quantum dot element 5, brightness (or luminance) of the red light or green light emitted may be reduced to some extent due to energy loss. For example, the luminance of the converted light emitted from the QD may be relatively weaker than that of the incident light. In this case, a light conversion efficiency that refers to a luminance ratio of the emitted light to the incident light may be less than 80%. This may cause a problem that RL and GL emitted from the red light quantum dot element 4 and green light quantum dot element 5, respectively, each have a relatively lower amount of light than that of the BL emitted from the light transmitter 6.

In the case that the areas of the third and fourth incidence faces 4i and 5i are each larger than the area of the second incidence face 6i and the areas of the third and fourth output faces 4*t* and 5*t* are each larger than the area of the second output face 6*t*, as described above, a greater amount of light of RL or GL may be incident upon or emitted from the red light quantum dot element 4 or green light quantum dot element 5 than the light e.g., BL incident upon or emitted from the light transmitter 6. Accordingly, the problem of relatively less RL and GL are produced than the BL due to the issue of the light conversion efficiency may be remedied, and a decrease in overall luminance that might occur after white balance adjustment may be reduced and/or prevented.

The red light quantum dot element 4 and the green light quantum dot element 5 may be arranged to be adjacent to each other, in which case the red light quantum dot element 4 and green light quantum dot element 5 may be bordered on their respective sides or may be arranged to keep their respective sides at a predetermined distance. In the latter case, a predetermined substance may be inserted between the red and green light quantum dot elements 4 and 5 to prevent them from interfering with each other.

As described above, since light is scattered at the QD, the red and green light quantum dot elements 4 and 5 scatter and emit RL and GL.

The light transmitter 6 transmits and emits the light incident from the light source 2 without changing the color. For example, if BL is incident upon the light transmitter 6, the light transmitter 6 emits light of the same color as that of the incident light, e.g., blue light BL1, BL2, BL3.

The light transmitter 6 may be implemented in the form of a thin plate with a predetermined thickness in a similar manner as for the red and green light quantum dot elements 4 and 5, the thin plate having one face 6*i* (or second incidence face) upon which light is incident and another face 6*t* (or second output face) from which light is emitted.

Referring to FIG. 2, the light transmitter 6 may, for example, include a main body 8, and at least one scattering particle 7 distributed inside the main body 8.

The main body 8 may be made of a light transmitting material that is able to transmit all or part of the incident light. The light transmitting material may, for example, include resins such as natural resins or synthetic resins, or materials having a certain degree or higher of transparency, such as glass. Synthetic resins may, for example, include epoxy resins, urethane resins, or polymethyl methacrylate (PMMA) resins, and glass may include silicate glass, borate glass, or phosphate glass.

The scattering particle 7 may be distributed arbitrarily or in a predetermined pattern inside the main body 8, scattering the incident light within a certain range. Part of the incident light (BL) scatters by coming in contact with the scattering particle 7, and accordingly, part of the light (BL) incident upon the light transmitter 6 is scattered and emitted within a certain range (BL1, BL3). On the other hand, part of the incident light (BL) may not come in contact with the scattering particle 7, in which case the light not in contact with the scattering particle 7 proceeds without change of direction. In other words, part of the incident light (BL) is scattered and emitted through the second output face 6*t* while another part may be emitted through the second output face 6*t* without being scattered.

As such, since some part of light is scattered by the scattering particle 7 and emitted BL1, BL3, the light that has passed the light transmitter 6 is emitted while being scattered and spread in the same or approximate range to the range of the light RL, GL emitted from the red and green light quantum dot elements 4 and 5. Since the incident BL is spread and emitted in comparison with a case where there is no scattering particle 7, the BL may proceed even in a direction d2 somewhat inclined at an angle θ from the front direction d1.

In the past, only RL and GL emitted from the red light quantum dot element 4 and the green light quantum dot element 5, respectively, were delivered to a point located at an angle from the front direction, so the blue light (BL2) was not visible, which is a cause of color viewing angle inferiority. However, in accordance with an example of the disclosure, blue light is emitted by being scattered by the scattering particle 7, and thus the blue light (BL1, BL3) may also be visible at the point. Accordingly, the color viewing angle inferiority may be resolved and/or improved.

The scattering particle 7 may, for example, employ at least one of zinc oxide ($Zn_xO_x$), titanium oxide ($Ti_xO_x$), and silicon oxide ($Si_xO_x$). In addition, various types of particles that are able to scatter incident light may be used as the scattering particle 7.

The quantum dot converter 3 and the light transmitter 6, and more particularly the red light quantum dot element 4, the green light quantum dot element 5, and the light transmitter 6 may, for example, be arranged on the same plane and implemented in the form of a single thin plate. The red light quantum dot element 4, the green light quantum dot element 5, and the light transmitter 6 may be installed on a certain substrate such that they are stably and fixedly arranged. The certain substrate may be implemented with a transparent material to pass the light emitted from the red light quantum dot element 4, the green light quantum dot element 5, and the light transmitting unit 6, e.g., a polymethyl metharcrylate resin.

Various examples of the pattern in which the quantum dot converter and light transmitting unit are arranged will now be described with reference to FIGS. 4 to 13.

Figure 3:
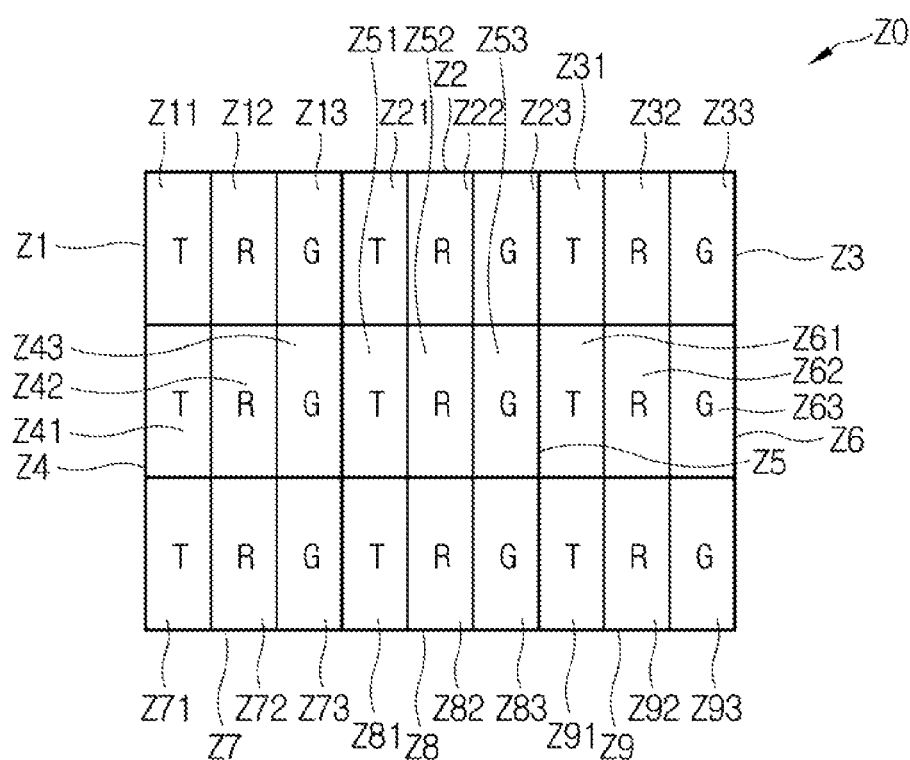
FIG. 3 illustrates an example arrangement of red light quantum dot elements, green light quantum dot elements, and light transmitters, unit sections, and sub-sections.

FIG. 3 illustrates an example of arranging red light quantum dot elements, green light quantum dot elements, and light transmitters, unit sections, and sub-sections.

Referring to FIG. 3, red light quantum dot elements 21, green light quantum dot elements 22, and light transmitters 30 may be arranged in a section z0 in a predetermined pattern. The section z0 refers to a single flat plate formed by a combination of the red light quantum dot elements 21, green light quantum dot elements 22, and light transmitters 30, or a section of a substrate on which the red light quantum dot elements 21, green light quantum dot elements 22, and light transmitters 30 are arranged.

The section z0 may be partitioned into multiple unit sections z1 to z9, and the multiple unit sections z1 to z9 may each have a red light QD element 21, a green light QD element 22, and a light transmitter 30 arranged therein. In this example, the pattern in which the red light quantum dot element 21, green light quantum dot element 22, and light transmitter 30 are arranged in each unit section z1 to z9 may be the same. For example, the form in which the red light quantum dot element 21, green light quantum dot element 22, and light transmitter 30 are arranged in one unit section z1 to z9 may be the same as in another unit section z1 to z9.

The one unit section z1 to z9 may, for example, represent a single pixel of an image. Pixel refers to a minimum unit element that forms a picture, and a set of light output from the respective pixels may form the picture.

The unit sections z1 to z9 may include a plurality of sub-sections z11 to z93. The light transmitter 30 is arranged at least one sub-section z11, z21, z31, z41, z51, z61, z71, z81, z91 in every unit section among the plurality of sub-sections z11 to z93, and the red light quantum dot element 21 and the green light quantum dot element 22 are arranged in the other sub-sections z12, z13, z22, z23, z32, z33, z42, z43, z52, z53, z62, z63, z72, z73, z82, z83, z92, z93 in every unit section.

As illustrated in FIG. 3, the unit sections z1 to z9 may each include three sub-sections z11 to z93, in which the light transmitter 30, the red light quantum dot element 21, and the green light quantum dot element 22 are sequentially arranged. Accordingly, the light transmitter 30, the red light quantum dot element 21, and the green light quantum dot element 22 are sequentially arranged in the first unit section z1, and in the same way the light transmitter 30, the red light quantum dot element 21, and the green light quantum dot element 22 are sequentially arranged in each of the second to ninth sections z2 to z9.

In the case that the light transmitter 30, the red light quantum dot element 21, and the green light quantum dot element 22 are arranged in each unit section z1 to z9, and BL is irradiated from the light source 10 (see FIG. 4), BL, RL, and GL may be emitted from each unit section z1 to z9 and the emitted BL, RL, and GL may be combined to form various colors. Accordingly, the respective unit sections z1 to z9 may emit various colors of light.

A structure in which the light transmitter 30, the red light quantum dot element 21, and the green light quantum dot element 22 are arranged in a single unit section will now be described below, for convenience of explanation, but it should be understood that such a structure may be equally applied to each of the other unit sections.

Figure 4:
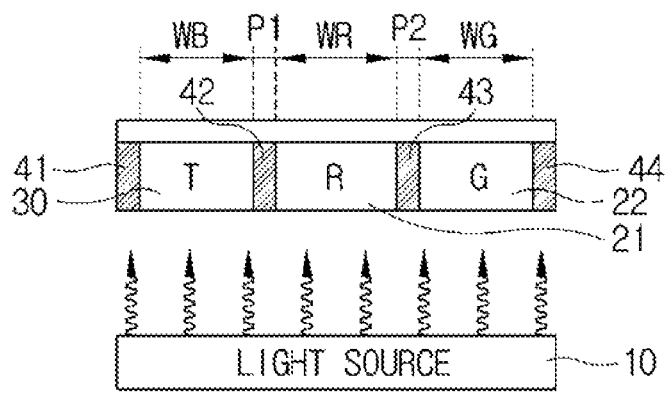
FIG. 4 is a side cross-sectional view illustrating an example display assembly.
Figure 5:
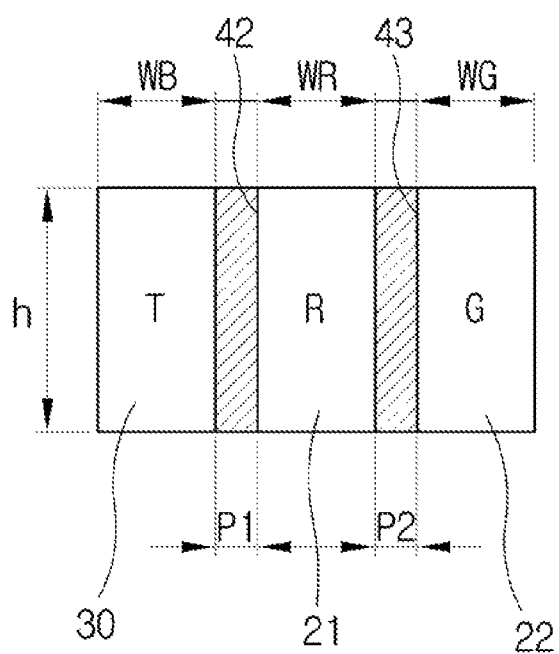
FIG. 5 is a plane view illustrating an example display assembly.

FIG. 4 is a side cross-sectional view illustrating an example display assembly, and FIG. 5 is a plane view of the example display assembly.

Referring to FIGS. 4 and 5, the light transmitter 30, the red light quantum dot element 21, and the green light quantum dot element 22 are sequentially arranged in a single unit section. For example, the single unit section includes three sub-sections, in which the light transmitter 30, the red light quantum dot element 21, and the green light quantum dot element 22 are sequentially arranged.

The order of arranging the light transmitter 30, the red light quantum dot element 21, and the green light quantum dot element 22 may, for example, be arbitrarily chosen by a designer. For example, as illustrated in FIGS. 4 and 5, the light transmitter 30, the red light quantum dot element 21, and the green light quantum dot element 22 may be sequentially arranged in the listed order, but may also be arranged in the order of the red light quantum dot element 21, green light quantum dot element 22, and light transmitter 30, or of the red light quantum dot element 21, light transmitter 30, and green light quantum dot element 22, according to the designer's choice.

The light transmitter 30, the red light quantum dot element 21, and the green light quantum dot element 22 may have the form of a flat plate, on which they may be arranged side by side.

The light transmitter 30, the red light quantum dot element 21, and the green light quantum dot element 22 may be arranged to be adjacent to each other.

As illustrated in FIGS. 4 and 5, the light transmitter 30, the red light quantum dot element 21, and the green light quantum dot element 22 in one or more unit sections may have gaps 41 to 44 in between, and accordingly, the light transmitter 30, the red light quantum dot element 21, and the green light quantum dot element 22 may be arranged at certain distances p1, p2 from one another. In the case that the light transmitter 30, the red light quantum dot element 21, and the green light quantum dot element 22 are apart from one another, the light transmitter 30, the red light quantum dot element 21, and the green light quantum dot element 22 may have cutoff walls in between to minimize influences from one another. For example, the walls may be formed of materials that block transmission of light.

As illustrated in FIG. 5, the light transmitter 30, red light quantum dot element 21, and green light quantum dot element 22 may, for example, have a rectangular form or a similar form when viewed from a direction in which the light is irradiated or from the opposite direction, in which case the light transmitter 30, the red light quantum dot element 21, and the green light quantum dot element 22 may have the same height h and same widths WB, WR, WG.

The light irradiated from the light source 10 may be separately incident upon the light transmitter 30, the red light quantum dot element 21, and the green light quantum dot element 22. If the light irradiated from the light source 10 is BL, the light transmitter 30 emits BL, the red light quantum dot element 21 emits RL, and the green light quantum dot element 22 emits GL. As described above, scattering particles may exist in the light transmitter 30 to scatter the incident BL such that the BL that has passed through the light transmitter 30 is spread and emitted.

Figure 6:
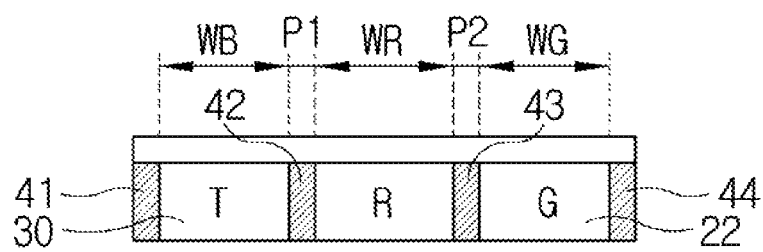
FIG. 6 is a side cross-sectional view illustrating an example display assembly.
Figure 7:
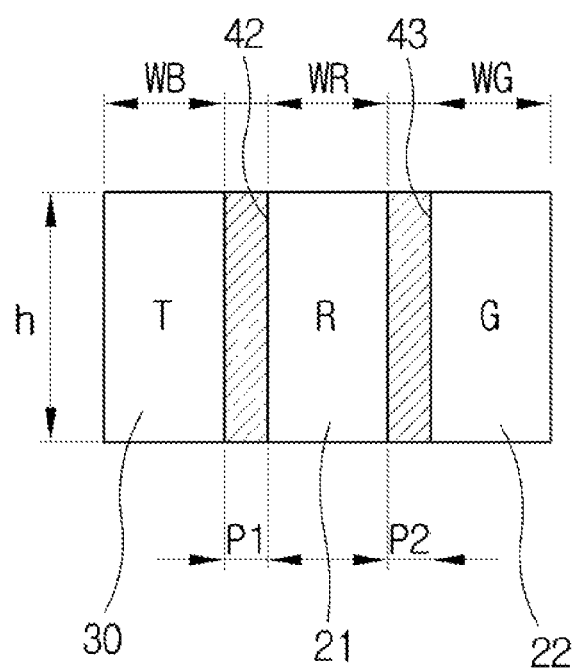
FIG. 7 is a plane view illustrating an example display assembly.

FIG. 6 is a side cross-sectional view illustrating an example display assembly, and FIG. 7 is a plane view illustrating the example display assembly.

Referring to FIGS. 6 and 7, in a similar manner as described above, the light transmitter 30, the red light quantum dot element 21, and the green light quantum dot element 22 may be sequentially arranged in the respective sub-sections in a single unit section, and the order of arranging them may be arbitrarily determined by the designer.

The light transmitter 30, the red light quantum dot element 21, and the green light quantum dot element 22 may have the form of a flat plate, on which they may be arranged side by side. The light transmitter 30, red light quantum dot element 21, and green light quantum dot element 22 may be arranged to be adjacent to one another, or arranged at certain distances p1, p2 from one another with gaps 41 to 44 in between.

As illustrated in FIG. 7, the light transmitter 30, red light quantum dot element 21, and green light quantum dot element 22 may, for example, have a rectangular form or a similar form when viewed from a direction in which the light is irradiated or from the opposite direction, in which case the light transmitter 30, the red light quantum dot element 21, and the green light quantum dot element 22 may have the same height h.

In an example, the red light quantum dot element 21 and green light quantum dot element 22 may have different areas from an area of the light transmitter 30. For example, an area of an incidence face or output face of at least one of the red light quantum dot element 21 and the green light quantum dot element 22 may be larger than an area of an incidence face or output face of the light transmitter 30.

For example, as shown in FIG. 7, widths WB, WR, and WG of the light transmitter 30, red light quantum dot element 21, and green light quantum dot element 22 are different from one another, wherein the width WR of the red light quantum dot element 21 may be larger than the width WB of the light transmitter 30, or the width WG of the green light quantum dot element 22 may be larger than the width WB of the light transmitter 30. In addition, the widths WR and WG of the red light quantum dot element 21 and green light quantum dot element 22, respectively, may both be larger than the width WB of the light transmitter 30. In the case that at least one of the widths WR and WB of the red light quantum dot element 21 and green light quantum dot element 22 is larger than the width WB of the light transmitter 30, luminance may be improved by increasing an amount of light of at least one of the emitted RL and GL. For example, in the case that the widths WR and WG of the red light quantum dot element 21 and green light quantum dot element 22 are larger than the width WB of the light transmitter 30, since the respective areas of the third and fourth incidence faces 4i and 5i are larger than an area of the second incidence face 6i, and the respective areas of the output face 4t and 5t are larger than an area of the second output face 6t, a greater amount of light of RL, GL may be incident upon or emitted from the red light quantum dot element 21 or green light quantum dot element 22 than an amount of light BL incident upon or emitted from the light transmitter 30, thereby increasing a ratio of amount of light of RL and GL, which are relatively interior to BL.

While FIGS. 6 and 7 illustrate an example where at least one of the widths WR and WG of the red light quantum dot element 21 and green light quantum dot element 22 is larger than the width WB of the light transmitter 30 to make the incidence face or output face of the red light quantum dot element 21 or the green light quantum dot element 22 larger in area than that of the light transmitter 30, the method of making the area of the red light quantum dot element 21 or the green light quantum dot element 22 larger than the area of the light transmitter 30 is not limited thereto. For example, by making at least one of heights of the red light quantum dot element 21 and the green light quantum dot element 22 be higher than the height of the light transmitter 30, the area of the incidence face or output face of the red light quantum dot element 21 and the green light quantum dot element 22 may be larger than that of the light transmitter 30. It is also possible to make both heights of the red light quantum dot element 21 and green light quantum dot element 22, and widths WR, WG of the red light quantum dot element 21 and green light quantum dot element 22 greater than the height and width WB of the light transmitter 30.

Figure 8:
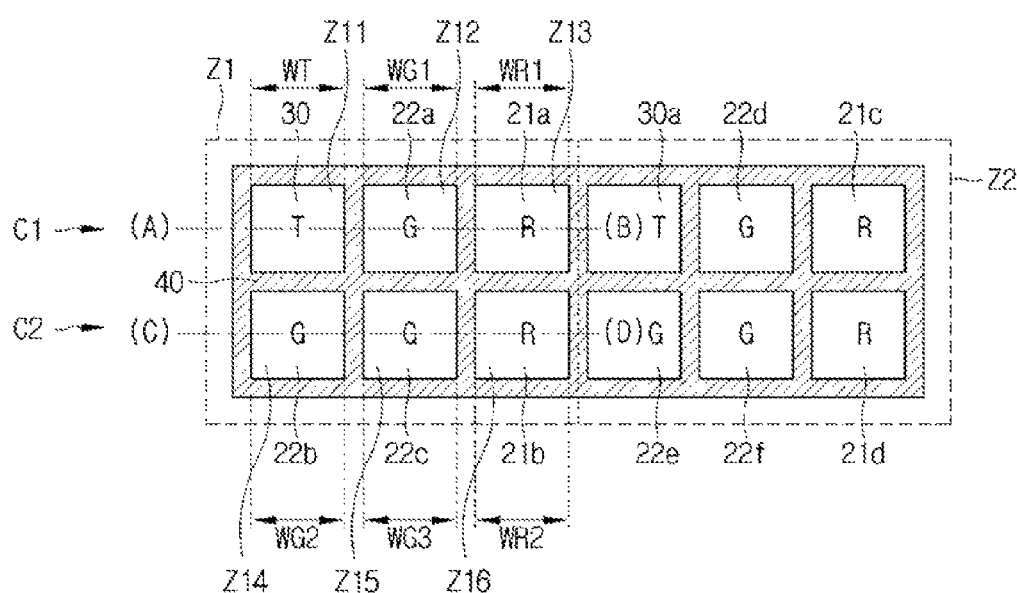
FIG. 8 is a plane view illustrating an example display assembly.
Figure 9:
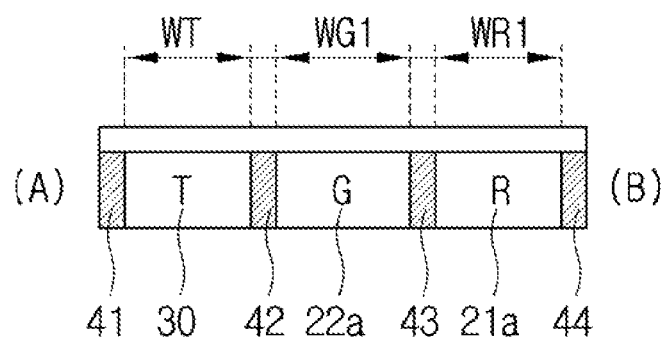
FIG. 9 is a first side cross-sectional view illustrating an example display assembly.
Figure 10:
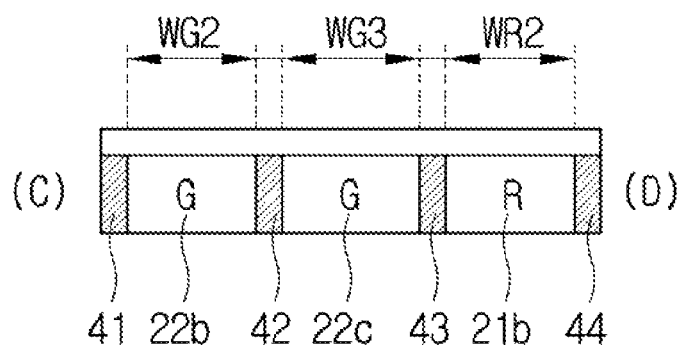
FIG. 10 is a second side cross-sectional view illustrating an example display assembly.

FIG. 8 is a plane view illustrating an example display assembly, and FIG. 9 is a first side cross-sectional view illustrating the example display assembly of FIG. 8. FIG. 10 is a second side cross-sectional view illustrating the example display assembly of FIG. 8. The first side cross-sectional view of FIG. 9 is obtained by cutting along line AB shown in FIG. 8, and the second side cross-sectional view of FIG. 10 is obtained by cutting along line CD shown in FIG. 8.

Figure 11:
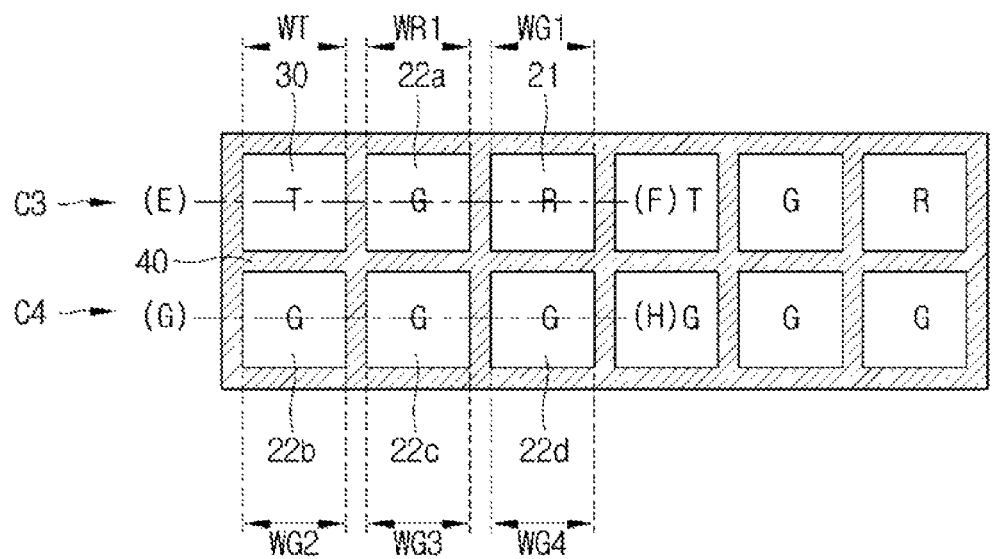
FIG. 11 is a plane view illustrating an example display assembly.
Figure 12:
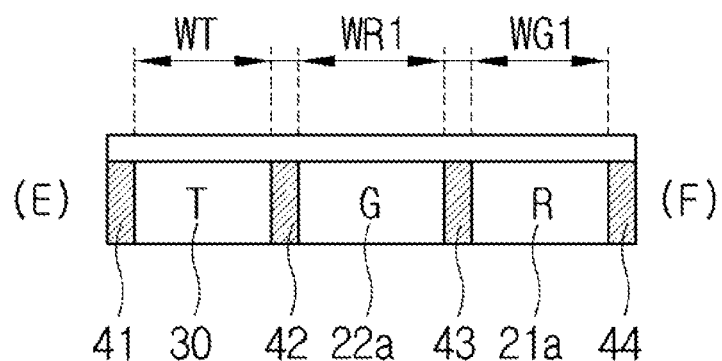
FIG. 12 is a first side cross-sectional view illustrating an example display assembly.
Figure 13:
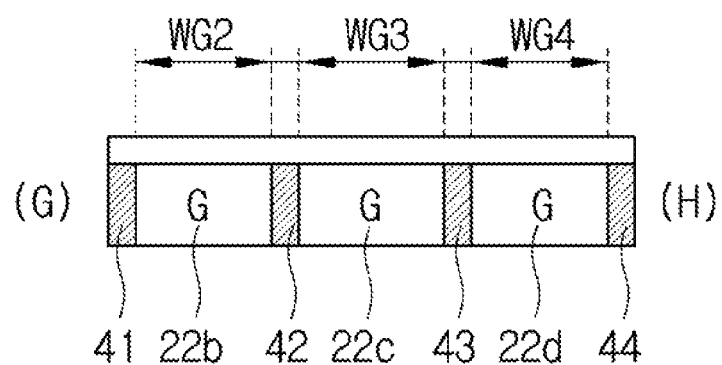
FIG. 13 is a second side cross-sectional view illustrating an example display assembly.

FIG. 11 is a plane view illustrating an example display assembly, according to another example. FIG. 12 is a first side cross-sectional view illustrating the example display assembly of FIG. 11, and FIG. 13 is a second side cross-sectional view illustrating the example display assembly of FIG. 11. The first side cross-sectional view of FIG. 12 is obtained by cutting along line EF shown in FIG. 11, and the second side cross-sectional view of FIG. 12 is obtained by cutting along line GH shown in FIG. 11.

Referring to FIGS. 8 to 13, a single unit section z1 may include four or more sub-sections z11 to z16. For example, the unit section z1 may include a total of six sub-sections z11 to z16 partitioned, which may be arranged in two rows (c1 and c2 in FIG. 8, and c3 and c4 in FIG. 11), each row having three sub-sections.

At least one of the red light quantum dot element 21, green light quantum dot element 22, and light transmitter 30 may be arranged in respective sub-sections z11 to z16.

For example, the number of red light quantum dot elements 21 or green light quantum dot elements 22 arranged in the unit section z1 may be the same as the number of light transmitters 30 arranged in the unit section z1.

Furthermore, as illustrated in FIG. 8, the red light quantum dot element 21 and the green light element 22 may be arranged such that the number of at least one of red light quantum dot elements 21 and the green light quantum dot elements 22 may be relatively greater than the number of light transmitters 30. For example, in the unit section z1, one light transmitter 30, two red light quantum dot elements 21, and three green light quantum dot elements 22 may be arranged.

Red light quantum dot elements 21a, 21b, green light quantum dot elements 22a to 22d, and one light transmitter 30 installed in the respective sub-sections z11 to z16 may be arranged to be adjacent to one another, or arranged at certain distances from one another. In the latter case, there may be predetermined gaps 41 to 44 formed between the red light quantum dot element 21, green light quantum dot element 22, and light transmitter 30.

In an example, as illustrated in FIGS. 8 to 10, the light transmitter 30 may be arranged in the first sub-section z11, the green light quantum dot elements 22a to 22c may be arranged in the second, fourth, and fifth sub-sections z12, z14, and z15, and the red light quantum dot elements 21c and 22d may be arranged in the third and sixth sub-sections z13 and z16.

Respective areas of the first red light quantum dot element 21a, the second red light quantum dot element 21b, the first green light quantum dot element 22a, the second green light quantum dot element 22b, the third green light quantum dot element 22c, and the light transmitter 30 may all be identical, or all be different, or partly be different. The difference in respective areas may be determined depending on portions of amounts of light of the emitted RL, GL, and BL. For example, if an amount of light of the emitted GL is less than that of the RL and that of the BL, more green light quantum dot elements 22a to 22c may be arranged in the unit section z1 than the red light quantum dot elements 21a, 21b and the light transmitter 30.

For example, as illustrated in FIG. 8, the first red light quantum dot element 21a, the second red light quantum dot element 21b, the first green light quantum dot element 22a, the second green light quantum dot element 22b, the third green light quantum dot element 22c, and the light transmitter 30 may all be rectangular or in the similar form.

In this case, heights of the first red light quantum dot element 21a, the second red light quantum dot element 21b, the first green light quantum dot element 22a, the second green light quantum dot element 22b, the third green light quantum dot element 22c, and the light transmitter 30 may be identical or be different.

In an example, the height of the first row c1 in which the first red light quantum dot element 21a, the first green light quantum dot element 22a, and the light transmitter 30 are arranged may be the same as the height of the second row c2 in which the second red light quantum dot element 21b, the second green light quantum dot element 22b, and the third green light quantum dot element 22c are arranged.

In another example, the height of the first row c1 and the height h5 of the second row c2 may be different. In the latter case, the height of the first row c1 may be higher than the height of the second row c2, or for example, the height of the first row c1 may be lower than the height of the second row c2.

The respective widths WR1, WR2, WG1, WG2, WG3, and WT of the first red light quantum dot element 21a, the second red light quantum dot element 21b, the first green light quantum dot element 22a, the second green light quantum dot element 22b, the third green light quantum dot element 22c, and the light transmitter 30 may be identical, or be different. In this case, the widths WR1, WR2, WG1, WG2, and WG3 of the first red light quantum dot element 21a, the second red light quantum dot element 21b, the first green light quantum dot element 22a, the second green light quantum dot element 22b, and the third green light quantum dot element 22c may be larger or smaller than the width WT of the light transmitter 30.

In another example, as illustrated in FIGS. 11 to 13, the light transmitter 30 may be arranged in the first sub-section z11, the green light quantum dot elements 22a to 22d may be arranged in the second, fourth, fifth, and sixth sub-sections z12, z14, z15, and z16, and the red light quantum dot element 21 may be arranged in the third sub-section z13.

In this case, in a similar manner as described above, the red light quantum dot element 21, the first green light quantum dot element 22a, the second green light quantum dot element 22b, the third green light quantum dot element 22c, the fourth green light quantum dot element 22d, and the light transmitter 30 may have the same width, or have different widths.

For example, the red light quantum dot element 21, the first green light quantum dot element 22a, the second green light quantum dot element 22b, the third green light quantum dot element 22c, the fourth green light quantum dot element 22d, and the light transmitter 30 may have a rectangular or similar form, and their heights and widths WR1, WG1, WG2, WG3, WG4, and WT may be the same or may be different. In this case, the height of the third row c3 and the height of the fourth row c4 may be different, or vice versa in some examples.

While an example of arranging the red light quantum dot elements 21, 21a, and 21b, green light quantum dot elements 22a to 22d, and light transmitter 30 in the six sub-sections z11 to z16 was described in connection with FIGS. 8 to 13, a method of arranging them is not limited thereto. For example, the red light quantum dot elements 21, 21a, and 21b, green light quantum dot elements 22a to 22d, and light transmitter 30 may be arranged in the six sub-sections z11 to z16 in various forms that may be considered by the designer. For example, the red light quantum dot elements 21, 21a, and 21b, green light quantum dot elements 22a to 22d, and light transmitter 30 may be arranged in the sub-sections z11 to z16 such that at least one of the number of the red light quantum dot element 21 and the number of the green light quantum dot element 22 may be equal to or greater than the number of the light transmitter 30. However, the number of the red light quantum dot elements 21, 21a, and 21b, the green light quantum dot elements 22a to 22d, and light transmitter 30 arranged is not limited to what are shown in FIGS. 8 to 13. For example, it is also possible to arrange two or more light transmitters 30 in the unit section z1.

While in the examples of FIGS. 3 to 13, the unit sections z1 to z9 each include three or six sub-sections z11 to z93, the number of sub-sections z11 to z93 is not limited thereto. Depending on the designer's choice, the number of sub-sections z11 to z93 arranged in each unit section z1 to z9 may be 2, 4, 5, 7, or more. In the case that the number of sub-sections z11 to z93 arranged in each unit section z1 to z9 may be 2, 4, 5, 7, or more, the red light quantum dot elements 21, 21a, 21b, green light quantum dot elements 22a to 22d, and light transmitter 30 may be arranged in various ways as described above.

Various examples of a display device employing the display assembly as described above will now be described in connection with FIGS. 14 to 20.

Figure 14:
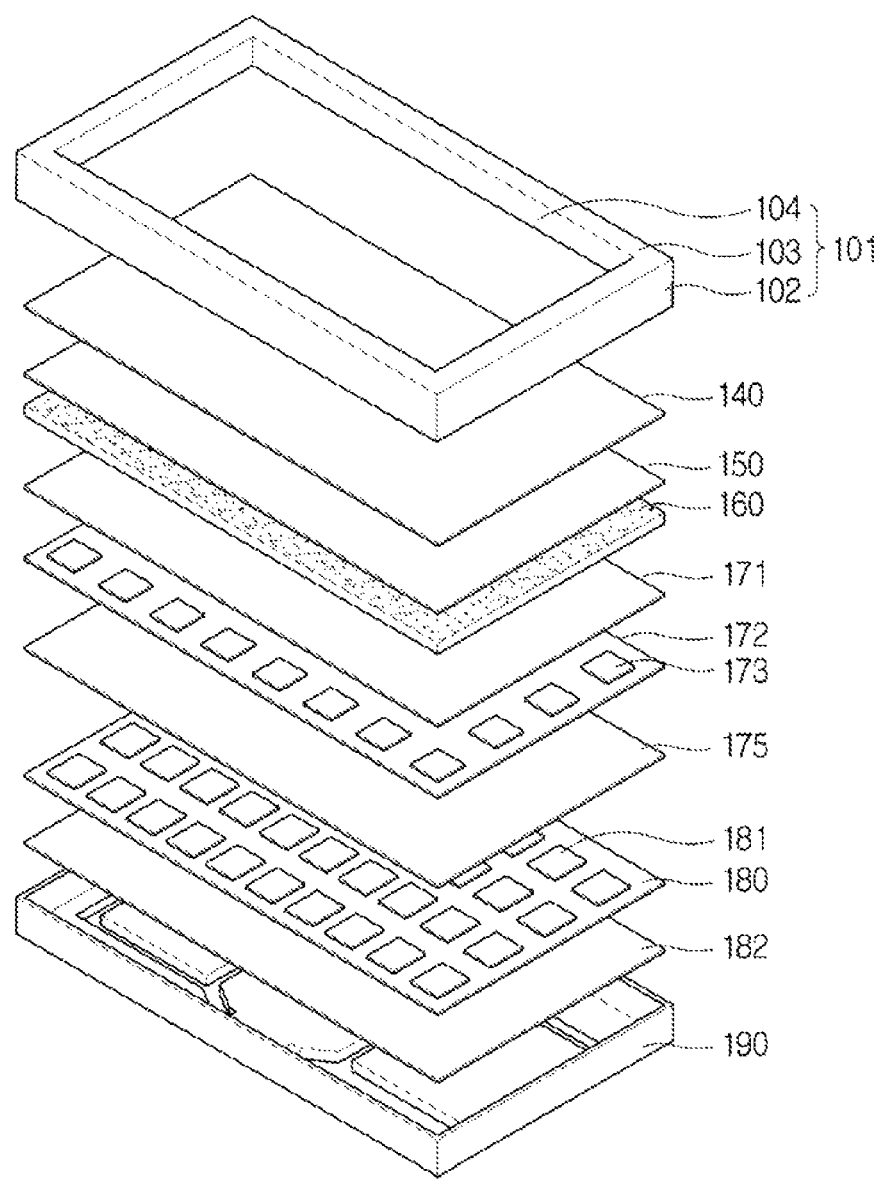
FIG. 14 is an exploded view illustrating an example display device.
Figure 15:
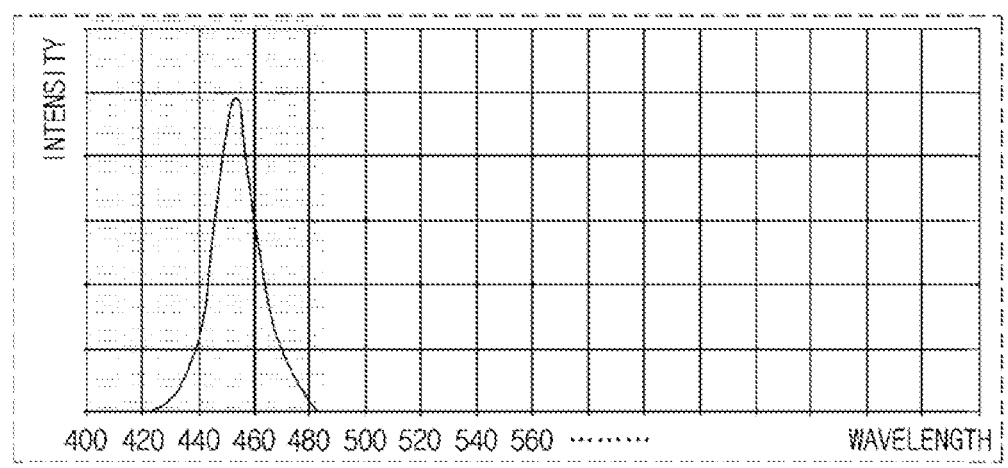
FIG. 15 illustrates a wavelength of blue light irradiated from a light source of an example display device.
Figure 16:
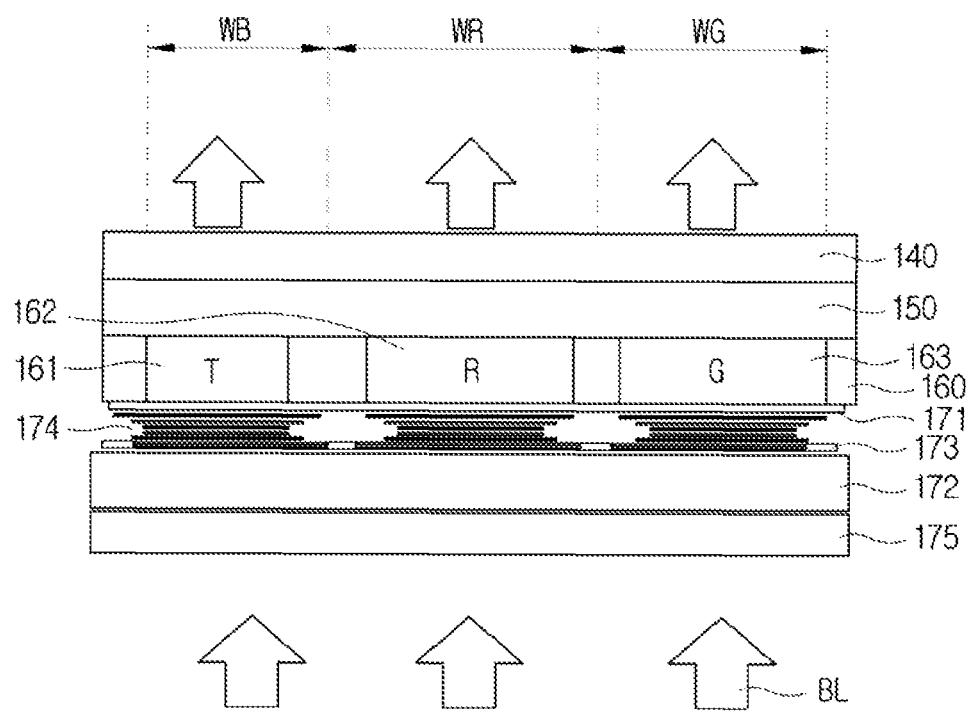
FIG. 16 is a side view illustrating an example display device.

FIG. 14 is an exploded view illustrating an example display device, and FIG. 15 illustrates a wavelength of blue light irradiated from a light source of the example display device. Referring to FIG. 15, the y-axis indicates intensities of light and the x-axis indicates wavelengths of the light. FIG. 16 is a side view illustrating the example display device of FIG. 14.

A display device 100, as shown in FIG. 14, may include housings 101, 190 that house the exterior, panel parts 140, 150, 160, 171, 172, 173, etc., for creating images, and Back Light Unit (BLU) parts 180, 181, 182, etc., for supplying light to the panel.

More specifically, referring to FIG. 14, the display device 100 may include a top housing 101, a first polarization filter 140, a first substrate 150, a QD sheet 160, a first electrode 171, a second substrate 172, a second electrode 173, a liquid crystal layer (not shown in FIG. 14), a second polarization filter 175, a third substrate 180, a light source 181, a reflecting plate 182, and a bottom housing 190. Some of the elements may be omitted according to the designer's choice. For convenience of explanation, upward and downward directions of FIG. 14 are referred to as front and rear directions, respectively.

The top housing 101 may be located on the front of the display device 100, forming the exterior of the front and sides of the display device 100. The top housing 101 is combined with the bottom housing 190 to contain various parts of the display device 100. The top housing 101 may stably fix the various parts of the display device 100 stably and protect them against direct external shocks.

The top housing 101 may include a fixing part 103 that constitutes a bezel, and a side part 102 extending from an end of the fixing part 103 to the bottom housing 191. An opening 104 is formed on the front of the top housing 101.

The fixing part 103 projects toward the opening 104 to fix the various parts included in the display device 100, such as the first polarization filter 140, the first substrate 150, and the QD sheet 160, thereby preventing them from falling out. The side part 102 may fix the various parts inside the display device 100, and protect various parts contained in the display device 100 against shocks from the side direction. The opening 104 exposes an image that is displayed after having passed the first polarization filter 140, thereby enabling the user to see the image.

The bottom housing 190 may be located on the bottom of the display device 100, forming the exterior of the bottom and sides of the display device 100. The bottom housing 190 is combined with the top housing 101 to contain various parts of the display device 100. The top housing 101 and bottom housing 190 may be formed in one body.

Inside the bottom housing 190, the third substrate 180 on which the light source 181 is arranged may be fixedly installed.

The third substrate 180 may apply an electric signal to the light source 181 installed on the third substrate 180 to enable the light source 181 to irradiate light of a certain wavelength. The third substrate 180 has various parts mounted thereon to control light irradiation of the light source 181. The various parts may, for example, include a processor or processors and various circuitries (not shown), the processor(s) being implemented with one or more semiconductor chips.

The processor may control general operation of the display device 100.

The third substrate 180 may be manufactured using various materials such as synthetic resins, or may be formed of polymethyl methacrylate resins or transparent materials like glass.

One or more light sources 181 may be arranged on the third substrate 180 in a predetermined pattern. For example, the predetermined pattern in which the light sources 180 are arranged may correspond to a pattern in which QD elements on the QD sheet 160 are arranged, but is not limited thereto. The light sources 181 may be arranged on the third substrate 180 in various pattern that may be considered by the designer.

The light sources 181 may irradiate light of a certain color in various directions. The light of a certain color may include BL as shown in FIG. 15. The BL refers to light that has a wavelength in a range from about 400 nm to about 500 nm and that visually observed as blue.

The light irradiated from the light source 181 may be irradiated directly to the second polarization filter 175, or may reflect off the reflecting plate 182 and then be irradiated to the second polarization filter 175.

The light source 181 may, for example, be implemented using an incandescent light bulb, halogen lamp, fluorescent lamp, natrium lamp, mercury lamp, fluorescent-mercury lamp, xenon lamp, arc light lamp, neon tube lamp, EL lamp, LED lamp, or like. It will be understood that many different lighting devices are available and that may be considered by the designer to be used as the light source 181.

The reflecting plate 182 may be installed in the back of the third substrate 180 for reflecting light that is proceeding to the back of the display device 100 after having been emitted from the light source 181 and having passed through the third substrate 180 toward the second polarization filter 175.

The reflecting plate 182 may be omitted in some examples. The reflecting plate 182 may, for example, be manufactured using synthetic resins such as Polyethylene Terephthalate (PET) or Polycarbonate (PC). It will be understood that the reflecting plate 182 may be manufactured using various materials that may be considered by the designer.

The second polarization filter 175 may polarize the light incident from the light source 181 upon the second substrate 172, such that the beams that vibrate in the same direction as the polarization axis may be incident upon the second substrate 172. As illustrated in FIGS. 14 to 16, the second polarization filter 175 may be installed to have one face come in contact with or be adjacent with the rear face of the second substrate 172. The second polarization filter 175 may, for example, be implemented in the form of a film. In some examples, the second polarization filter 175 may include a vertical polarization filter. The vertical direction as used herein includes a direction parallel with a line passing through top and bottom boundary lines of the display device 100.

In an example, at least one optical plate (not shown) may further be installed between the second polarization filter 175 and the third substrate 180. The optical plate may include e.g., a protective film, at least one spread sheet, and at least one prism film.

The spread sheet may serve to spread the incident light. By spreading the incident light, the spread sheet may serve to uniformly spread the light irradiated from the light source 181 in different directions. The light irradiated from the light source 181 may pass through the spread sheet and then be incident upon the prism film.

The prism film may refract the light spread by the spread sheet, thereby enabling the light to be vertically incident upon the second substrate 172. On one side of the prism film, prisms may be arranged in a predetermined pattern. In some examples, there may be a plurality of prism films arranged.

The protective film may be arranged to be adjacent to the second polarization filter 175 for protecting the spread sheet or prism film against external stimuli or dirt.

The second substrate 172 may have one side on which the second electrode 173 may be installed and the other side on which the second polarization filter 175 may be installed. The second substrate 172 may be implemented with a transparent material for the light irradiated from the rear direction to pass through, e.g., synthetic resins such as acryl, glass, or the like. The second substrate 172 may also include a Flexible Printed Circuit Board (FPCB) in some examples. The second electrode 173 is installed on the second substrate 172.

The second electrode 173 installed on the second substrate 172 applies a current to the liquid crystal layer 174 together with the first electrode 171 based on supplied power, thereby controlling arrangement of liquid crystal molecules in the liquid crystal layer 174 to create various images.

In an example, the second electrode 173 may be implemented with Thin Film Transistors (TFTs). The second electrode 173 may be connected to an external power source to receive power. A plurality of second electrodes 173 may be installed on the second substrate 172 in a predetermined pattern.

The first electrode 171 may be arranged to face the second electrode 173 with respect to the liquid crystal layer (not shown), and may serve to apply a current to the liquid crystal layer together with the second electrode 173. The first electrode 171 may be arranged to border on the QD sheet 160 on one face, and border on the liquid crystal layer on the other face. The first electrode 171 may be implemented as a common electrode.

The liquid crystal layer (not shown) is arranged between the first and second electrodes 171 and 173, and there may be a plurality of liquid crystal molecules arranged in the liquid crystal layer.

Liquid crystal is a material in a medium state between fluid and crystal, and may include a plurality of liquid crystal molecules. The liquid crystal molecules may be arranged in the liquid crystal layer in multiple rows, and may be arranged to be oriented in a certain direction by a produced electric field. The liquid crystal molecules may be arranged not to be oriented if the electric field disappears. The liquid crystal may pass light intact or may polarize the light and transmit the polarized light, depending on the orientation of the liquid crystal molecules.

For example, the liquid crystal molecules in the liquid crystal layer may be arranged in different forms depending on power applied across the first and second electrodes 171 and 173.

For example, with the power applied across the first and second electrodes 171 and 173, the liquid crystal molecules may be arranged in a straight line in the direction of a line connecting the first and second electrodes 171 and 173, thereby transmitting light. If the first polarization filter 140 is a horizontal polarization filter and the second polarization filter 175 is a vertical polarization filter, the liquid crystal layer passes the vertically polarized light intact, so the light that has passed the liquid crystal layer is blocked by the first polarization filter 140 which is the horizontal polarization filter. Accordingly, the light that has passed the liquid crystal layer is not displayed on the screen of the display device 100.

When no power is applied across the first and second electrodes 171 and 173, the liquid crystal molecules may be spirally arranged toward a direction perpendicular to the line connecting the first and second electrodes 171 and 173, thereby polarizing the transmitted light. If the first and second polarization filters 140 and 175 are horizontal and vertical polarization filters, respectively, the liquid crystal molecules polarize the vertical light that has passed through the first polarization filter 140 to the horizontal direction. The light polarized to the horizontal direction while passing through the liquid crystal layer may pass the first polarization filter 140, and accordingly, the light incident upon the liquid crystal layer may be displayed on the screen of the display device 100.

The QD sheet 160 may output incident light of a certain color by converting or not converting the light into another color.

The QD sheet 160 is arranged to be adjacent to the first electrode 171 on one face and has the other face mounted on the first substrate 150.

The QD sheet 160 may include at least one red light quantum dot element 162 that converts the incident BL to output RL, at least one green light quantum dot element 163 that converts the incident BL to output GL, and a light transmitter 161 that transmits BL.

For example, the light transmitter 161 may scatter all or part of the BL and emit the scattered BL.

The light transmitter 161, the red light quantum dot element 162, and the green light quantum dot element 163 may be arranged to correspond to respective groups of liquid crystal molecules of the liquid crystal layer 174, as illustrated in FIG. 16. Specifically, one light transmitter 161 corresponds to a group of liquid crystal molecules, one red light quantum dot element 162 corresponds to another group of liquid crystal molecules, and one green light quantum dot element 163 corresponds to yet another group of liquid crystal molecules.

More red light quantum dot elements 162 and green light quantum dot elements 163 may be arranged in the QD sheet 160 than the light transmitter 161. For example, as described above, more red and green light quantum dot elements 162 and 163 than the light transmitter 161 may exist in at least one unit section in the QD sheet 160.

The red and green light quantum dot elements 162 and 163 may convert BL irradiated from the light source 181 to RL or GL by means of the QD and emit the RL and GL toward the first substrate 150. For example, the red and green light quantum dot elements 162 and 163 may convert the incident light, scatter the converted light, and emit the scattered light. Accordingly, the RL or GL transmitted and emitted from the first polarization filter 140 and the first substrate 150 may be observed at a relatively wide viewing angle.

The red light quantum dot element 162 or green light quantum dot element 163 may have a certain size, particularly a size sufficient to convert substantially all the BL that has passed the liquid crystal molecules of the liquid crystal layer 174 to RL or GL.

The red light quantum dot element 162 and the green light quantum dot element 163 may be larger in size than the light transmitter 161. For example, the red light quantum dot element 162 and the green light quantum dot element 163 may have a larger incidence face upon which light is incident or a larger output face from which the light is emitted than that of the light transmitter 161. For example, the widths WR and WG of the red and green light elements 162 and 163 may be relatively larger than the width WB of the light transmitter 161.

In this way, with the red light quantum dot element 162 and the green light quantum dot element 163 being larger in size than the light transmitter 161, the red light quantum dot element 162 and the green light quantum dot element 163 may emit more amount of light in the front direction than the light transmitter 161 does.

The light transmitter 161 may emit the incident BL as it is, without conversion. The light transmitter 161 may include a main body and scattering particles distributed in the main body, the scattering particle scattering the incident BL to be output toward the first substrate 150. Accordingly, the BL transmitted and emitted from the first polarization filter 140 and the first substrate 150 may also be observed at the same or similar angle to the viewing angle of the BL and GL. The main body 8 may, for example, be made of a light transmitting material, which may include a resin such as a natural resin or a synthetic resin, or a material such as glass that has a certain degree or higher of transparency. The scattering particle 7 may, for example, include zinc oxide $Zn_xO_x$*, titanium oxide $Ti_xO_x$, silicon oxide $Si_xO_x$, and the like.

The light transmitter 161 may be relatively smaller than at least one of the red light quantum dot element 162 and the green light quantum dot element 163. For example, the width WB of the light transmitter 161 may be relatively smaller than the width of at least one of the red light quantum dot element 162 and the green light quantum dot element 163.

Even in the case that the light transmitter 161 is relatively smaller than at least one of the red light quantum dot element 162 and the green light quantum dot element 163, the size of liquid crystal molecules in the corresponding row may be the same as the size of liquid crystal molecules in the row corresponding to at least one of the red light quantum dot element 162 and the green light quantum dot element 163. Accordingly, part of the incident BL may not be emitted in the front direction by being blocked by e.g., a cut-off wall without passing the light transmitter 161. The BL that has passed the light transmitter 161 may thus have a relatively less amount of light than that of at least one of RL and GL emitted from at least one of the red light quantum dot element 162 and the green light quantum dot element 163. Accordingly, as described above, the problem that the portion of an amount of light of BL is greater than that of RL or GL may be resolved and/or improved.

The light transmitter 161, the red light quantum dot element 162, and the green light quantum dot element 163 may border on one another, or may be at certain distances from one another. In the latter case, the light transmitter 161, the red light quantum dot element 162, and the green light quantum dot element 163 may have cut-off walls in between.

The light transmitter 161, the red light quantum dot element 162, and the green light quantum dot element 163 were described in detail with reference to FIGS. 1 to 13, and so the detailed description of them will be omitted herein.

The first substrate 150 has one side on which the QD sheet 160 is installed and the other side on which the first polarization filter 140 is installed. Specifically, on the first substrate 150, the red light quantum dot element, the green light quantum dot element, and the light transmitter may be installed in their respective predetermined patterns. For example, the first substrate 150 may be partitioned into multiple unit sections, each unit section having the red light quantum dot element, the green light quantum dot element, and the light transmitter installed therein in the same pattern. Each unit section may include a plurality of sub-sections. The red light quantum dot element, the green light quantum dot element, and the light transmitter may be installed in their respective sub-sections.

The first substrate 150 may be implemented with a transparent material to transmit the RL, GL, and BL emitted from the QD sheet 160. For example, the first substrate 150 may be manufactured using a synthetic resin or glass.

The first polarization filter 140 may be installed on the front face of the first substrate 150 for polarizing the light transmitted and emitted from the first substrate 150, e.g., RL, GL, and BL. Due to the polarization by the first polarization filter 140, at least one of RL, GL, and BL transmitted and emitted from the first substrate 150 may or may not be emitted out of the display device 100.

A polarization axis of the first polarization filter 140 may be perpendicular to a polarization axis of the second polarization filter 175, and accordingly, if the second polarization filter 175 is a vertical polarization filter, the first polarization filter 140 may be a horizontal polarization filter. The horizontal direction herein refers to a direction perpendicular to a line passing through top and bottom boundary lines of the display device 100.

An example of the display device 100 has thus far been described, but the display device 100 may further include various parts determined by the designer. For example, a touch screen panel may further be included to manipulate the display device 100 with touches.

Figure 17:
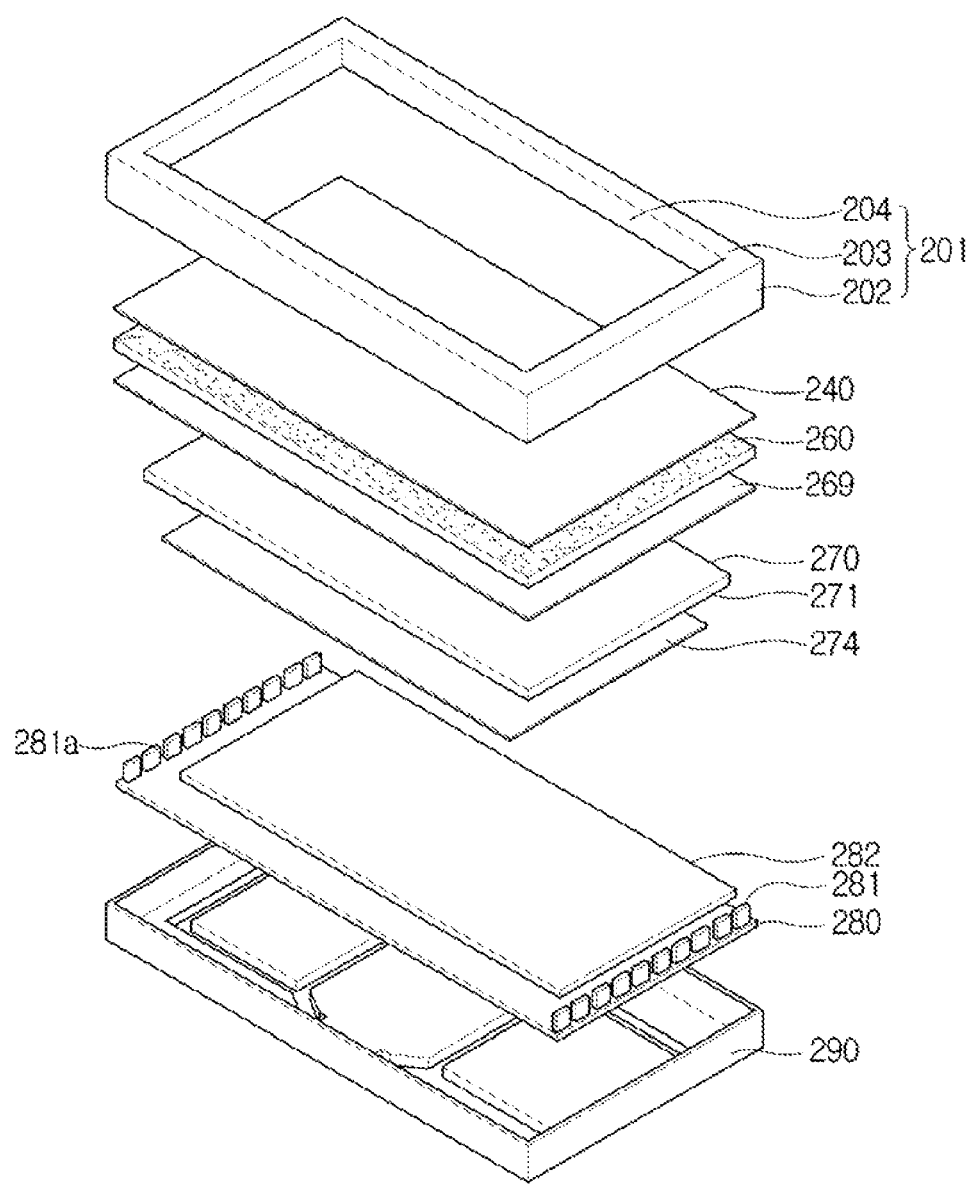
FIG. 17 is an exploded view illustrating an example display device.
Figure 18:
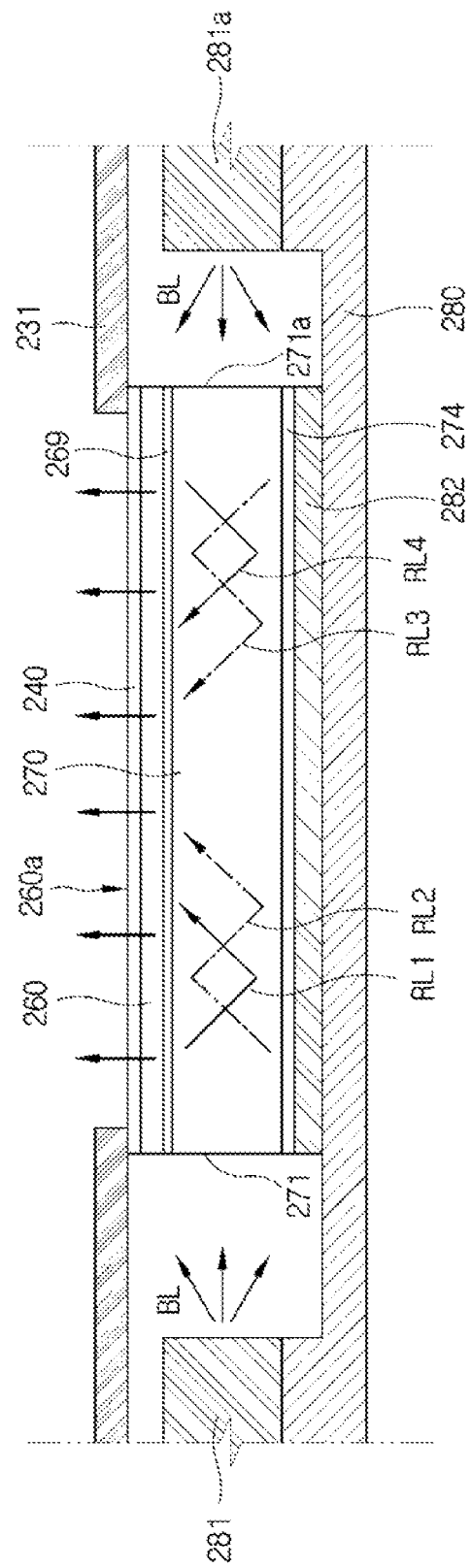
FIG. 18 is a side view illustrating an example display device.

FIG. 17 is an exploded view illustrating another example display device, and FIG. 18 is a side view illustrating the example display device. For convenience of explanation, upward and downward directions of FIGS. 17 and 18 are referred to as front and rear directions, respectively.

In this example, a display device 200 may include housings 201, 290 that constitute the exterior, panel parts 240, 260, etc., for creating images, and Back Light Unit (BLU) parts 270, 274, 280, 281, 282, etc., for supplying light to the panel.

More specifically, the display device 200 may include a top housing 201, a polarization filter 240, a QD liquid crystal display (LCD) unit 260, another polarization filter 269, a light guide plate 270, a reflecting plate 274, a substrate 280, light sources 281, 281*a*, and a bottom housing 290. Depending on the designer's choice, some of them may be omitted or new parts may further be included.

The top housing 201 may be located on the front of the display device 200, and the bottom housing 290 may be located on the back of the display device 100. The top and bottom housings 201 and 290 may be combined to form the exterior of the front, back and sides of the display device 200.

The top housing 201 and bottom housing 290 may have various parts of the display device 200 contained in the display device 200. The top housing 201 and bottom housing 290 stably fix the various parts of the display device 200 and protects them against external shocks.

The top housing 201 may include a fixing part 203 that constitutes a bezel, and a side part 202 extending from an end of the fixing part 203 toward the bottom housing 291. An opening 204 may be formed on the front of the top housing 201.

Inside the bottom housing 290, a substrate 280 on which the light sources 281, 281*a* are arranged may be fixedly installed.

The substrate 280 applies an electric signal to the light sources 281, 281*a* to irradiate light of a certain wavelength. Various parts for controlling the light sources 281, 281*a* may also be mounted on the substrate 280. Furthermore, a processor may be installed on the substrate 280 to control general operation of the display device 200, in addition to the light sources 281, 281*a*, and the processor may be implemented with one or more semiconductor chips and associated parts.

A spacer 282 may be installed on the substrate 280 to protect a face of the substrate 280, and the reflecting plate 274 and the light guide plate 270 may be installed in front of the spacer 282.

The light sources 281, 281*a* may irradiate light of a certain color in various directions. The light of a certain color may include BL. The light sources 281, 281*a* are installed on either sides of the light guide plate 270 at a certain distance to the sides of the light guide plate 270. In the case that the two light sources 281, 281*a* are installed on one substrate 280, the two light sources 281, 281*a* may be installed to face each other across the light guide plate 270.

In some examples, the light sources 281, 281*a* may be directly installed on the substrate 280, or may be installed on the top of a cradle separately arranged on the substrate 280.

Light irradiated from the respective light sources 281, 281*a* may be incident into the light guide plate 270 through the sides 271, 271*a* of the light guide plate 270 (RL1 to RL4), be totally reflected inside the light guide plate 270, and may propagate to uniformly spread across the QD LCD unit 260.

The light sources 281, 281*a* may use incandescent light bulbs, halogen lamps, fluorescent lamps, natrium lamps, mercury lamps, fluorescent-mercury lamps, xenon lamps, arc light lamps, neon tube lamps, EL lamps, LED lamps, or like. It will be understood that many different lighting devices may be considered by the designer and may be used as the light sources 281, 281*a*.

The spacer 282 installed on one face of the substrate 280 may prevent various parts projecting in the front direction, e.g., semiconductor chips from coming in contact directly with the reflecting plate 274 and thus damaging to one another.

The reflecting plate 274 may be installed on the front face of the spacer 282, for reflecting a beam that is proceeding in the rear direction among beams proceeding inside the light guide plate 270, to the front direction, and thereby directing the light irradiated from the light sources 281, 281*a* toward the QD LCD unit 260. The reflecting plate 274 may be manufactured using synthetic resins such as PET or PC. It will be understood that the reflecting plate 274 may be manufactured using various materials that may be considered by the designer.

The light guide plate 270 may reflect the light emitted from the light sources 281, 281*a* inside the light guide plate 270 one or more times, allowing the light emitted from the light sources 281, 281*a* to be uniformly supplied to the QD LCD unit 260. The light irradiated from the light sources 281, 281*a* is incident upon the sides 271, 271*a* of the light guide plate 270. On the front face of the light guide plate 270, the QD LCD unit 260 may be arranged, and on the rear face, the reflecting plate 274 may be arranged through adhesion. The light guide plate 270 may be manufactured using a material with high light transmissivity, e.g., a polymethyl methacrylate resin.

The QD LCD unit 260 may be installed ahead of the light guide plate 270. The polarization filter 269 for polarizing the light emitted through the light guide plate 270 may further be installed between the QD LCD unit 260 and the light guide plate 270. Furthermore, in some examples, at least one of a protective film (not shown), a spread sheet (not shown), and a prism film (not shown) may be installed between the polarization filter 269 and the light guide plate 270. This was already described above, so the details will be omitted herein.

The QD LCD unit 260 may output incident light of a certain color by converting or not converting the light into another color. In a similar manner as what is illustrated in FIG. 16, the QD LCD unit 260 may include a liquid crystal layer, a first and second electrodes placed in front and back of the liquid crystal layer, respectively, a QD sheet installed near the first electrode, a first substrate installed on the front face of the QD sheet, and a second substrate on which the second electrode is installed.

Liquid crystal molecules may exist in the liquid crystal layer. They may be arranged to transmit or cut off light depending on the power supplied across the first and second electrodes.

The first and second electrodes apply the power to the liquid crystal layer to control the arrangement of the liquid crystal molecules in the liquid crystal layer. The second electrode may be implemented with thin film transistors. There may be multiple second electrodes. The first electrode may be a common electrode.

The QD sheet is configured to convert a color of incident light, e.g., BL to another color of light, or to output the color of incident light without conversion. For example, the QD sheet may include at least one red light QD element that converts the incident BL to output RL, at least one green light QD element that converts the incident BL to output GL, and a light transmitter that transmits BL.

The red light QD element and the green light QD element each have an incidence face upon which light is incident and output face from which light is emitted larger than those of the light transmitter.

More red light QD elements and more green light QD elements may be arranged in the QD sheet than light transmitters. For example, in at least one unit section that partitions the QD sheet, more red light QD elements and more green light QD elements may exist than light transmitters.

The light transmitter emits the incident BL intact without conversion, in which case it may scatter the BL to some extent and emit the scattered BL. For this, the light transmitter may include a main body and scattering particles distributed in the main body.

The first and second substrates may be manufactured using transparent materials, e.g., synthetic resins such as polymethyl methacryl or glass, the first substrate having the QD sheet installed thereon and the second substrate having the second electrode installed thereon.

The liquid crystal layer, the first electrode, the second electrode, the QD sheet, the first substrate, and the second substrate were described above in connection with FIGS. 15 and 16, so the detailed description of them will be omitted herein.

The polarization filter 240 polarizes and emits RL, GL, and BL emitted from the QD LCD unit 260. The polarization axis of the polarization filter 240 may be different from that of a polarization filter arranged between the light guide plate 270 and the QD LCD unit 260. For example, they may be perpendicular to each other.

An example of the display device 200 has thus far been described, but the display device 200 may further include other various parts selected by the designer. For example, a touch screen panel may further be included to manipulate the display device 200 with touches, and a separate protective film may be mounted on the front face of the display device 200.

Figure 19:
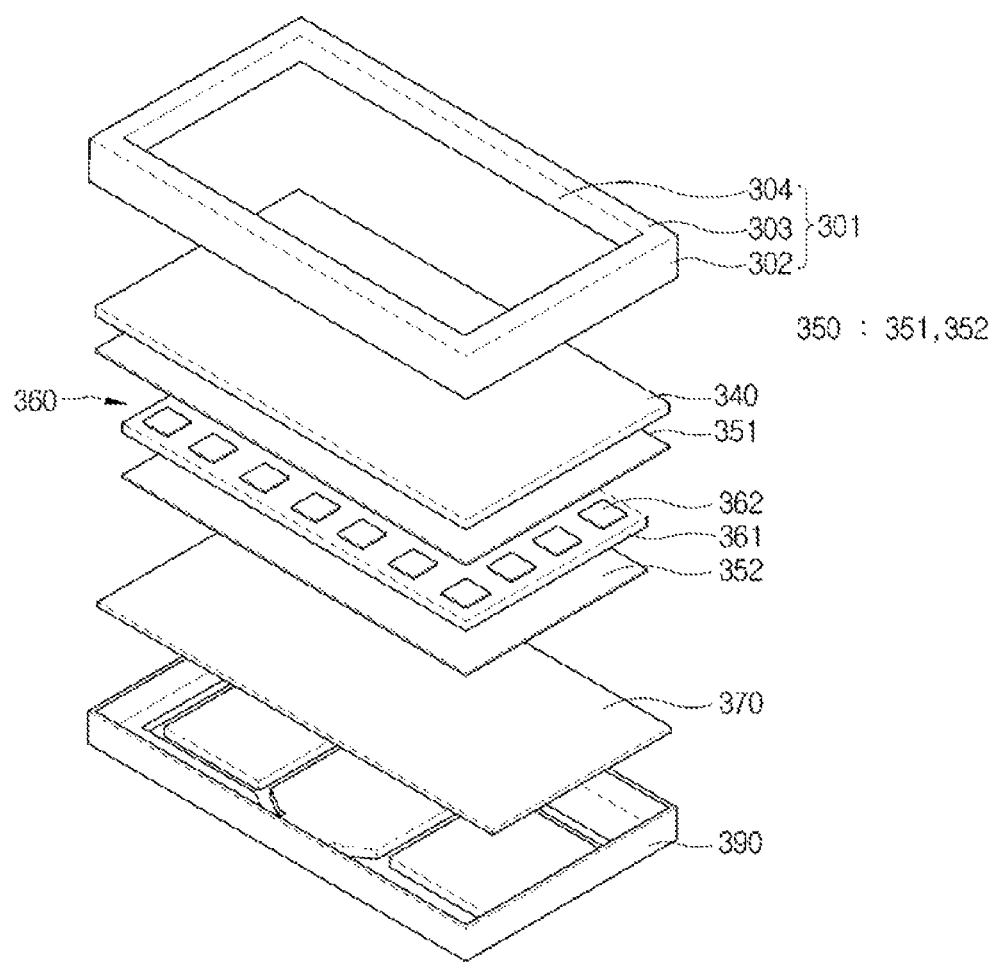
FIG. 19 is an exploded view illustrating an example display device.
Figure 20:
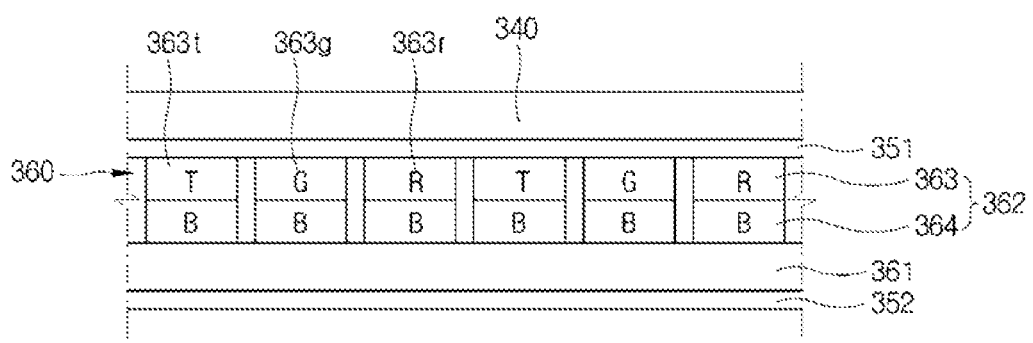
FIG. 20 is a side view illustrating an example display device.

FIG. 19 is an exploded view illustrating another example display device, and FIG. 20 is a side view illustrating the example display device.

A display device 300 may, for example, use Organic Light Emitting Diodes (OLEDs) to output light, thereby displaying an image on the screen. For example, in this example, the display device 300 may include a top housing 301, a first substrate 340, an electrode 350, an OLED unit 360, a second substrate 370, and a bottom housing 390. Depending on the designer's choice, some of these elements may be omitted or new parts may further be included.

The top housing 301 is located on the front of the display device 300, and the bottom housing 390 may be located on the back of the display device 300. The top and bottom housings 301 and 390 may be combined to form the exterior of the display device 300.

The top and bottom housings 301 and 390 have various parts of the display device 300 contained in the display device 300, and stably fix and protect them from external shocks. The top housing 301 may include a fixing part 303 that constitutes a bezel, and a side part 302 extending from an end of the fixing part 303 toward the bottom housing 391. An opening 304 may be formed on the front of the top housing 301. The bottom housing 391 may be combined with the side part 302 to fix the various parts therein.

The first substrate 340 is configured to have a front face exposed to the outside and a rear face having the electrode 350 and OLED unit 360 installed thereon. On the front face of the first substrate 340, various optical sheets such as protective films or polarization films may further be installed.

The first substrate 340 may be implemented with a transparent material to transmit the RL, GL, and BL emitted from the OLED unit 360. For example, the first substrate 150 may be manufactured using a synthetic resin or glass.

The electrode 350 includes first and second electrodes 351 and 352, and there is the OLED unit 360 arranged between the first and second electrodes 351 and 352. The first and second electrodes 351 and 352 are electrically connected to an external power source, and take on the cathode or anode according to the external power source. When the first and second electrodes 351 and 352 take on the cathode or anode, a current flows in a light emitting unit 364 of the OLED unit 360, which is formed of fluorescent organic compounds. With the current flowing, the light emitting unit 364 emits light while an electron is combined with a hole.

The first electrode 351 may be a common electrode. The second electrode 352 may be arranged as many as to correspond to the respective organic compounds of the light emitting unit 364, and accordingly, there may be a plurality of second electrodes 352 according to the number of the organic compounds of the light emitting unit 364.

At least one of the first and second electrodes 351 and 352 may be implemented with a metal thin film formed of aluminum, silver, magnesium, calcium, or a combination thereof, and the other one may, for example, be implemented using Indium Tin Oxide (ITO).

The first electrode 351 may act as the anode, and the second electrode 352 may act as the cathode.

The OLED unit 360 may include a light output unit 362 for outputting light of a certain color, and a substrate 361 on which the light output unit 362 is installed. The light output unit 362 may include a light color decision unit 363 and the light emitting unit 364.

The light color decision unit 363 may output light of a certain color by converting or not converting the light into another color. The light color decision unit 363 is configured to output BL by converting or not converting the BL to RL or GL. For example, the light decision unit 363 may include at least one red light quantum dot element 363r that converts BL to output RL, at least one green light quantum dot element 363g that converts BL to output GL, and a light transmitter 363t that transmits BL.

At least one of the red light quantum dot element 363r and the green light quantum dot element 363g may be designed to have a larger area than that of the light transmitter 363t, such that the output face from which RL or GL is emitted is larger than the output face of the light transmitter 363t from which BL is emitted. Accordingly, the problem that the amount of light of RL and the amount of light of GL converted and emitted by the red light quantum dot element 363r and the green light quantum dot element 363g are insufficient as compared to the amount of light of BL emitted from the light transmitter 363t may be resolved.

The OLED unit 360 may include at least one of the red light quantum dot element 363r and the green light quantum dot element 363g relatively more than the light transmitter 363t. Accordingly, the problem that the amount of at least one of RL and GL emitted from the OLED unit 360 is insufficient compared to the amount of BL may be resolved and/or improved.

The light transmitter 363t emits the BL intact without conversion, in which case it may scatter the BL to some extent and emit the scattered BL. For example, the light transmitter may include a main body and scattering particles distributed in the main body. The main body may be formed of a material such as a synthetic resin or glass, and the scattering particles may be uniformly distributed inside the synthetic resin or glass. The scattering particles may scatter the BL emitted from the light emitting unit 364 to prevent BL emitted from the light transmitter 363t from spreading at a relatively narrower angle than of the RL and the GL converted and emitted from the red light quantum dot element 363r and the green light quantum dot element 363g. Accordingly, the color viewing angle inferiority may be resolved and/or improved.

The red light quantum dot element 363r, the green light quantum dot element 363g, and the light transmitter 363t were described in detail with reference to FIGS. 1 to 13, so the detailed description of them will be omitted herein.

The light emitting unit 364 may receive electron and hole injections based on a voltage applied across the first and second electrodes 351 and 352, and combine the injected electrons and holes to emit light. The light emitting unit 364 may be a blue phosphate element in an example, in which case the red light quantum dot element 363r or the green light quantum dot element 363g may convert the BL emitted from the blue phosphate element into red or green and emit the RL or GL, and the light transmitter 363t may scatter the BL and emit the scattered BL.

As illustrated in FIG. 20, each light emitting unit 364 may be installed for each of the red light quantum dot element 363r, the green light quantum dot element 363g, and the light transmitter 363t. For example, the red light quantum dot element 363r may receive and convert light emitted from a first light emitting unit of the light emitting unit 364, the green light quantum dot element 363g may receive and convert light emitted from a second light emitting unit, which is different from the first light emitting unit of the light emitting unit 364, and the light transmitter 363t may scatter light emitted from a third light emitting unit, which is different from the first and second light emitting units of the light emitting unit 364 and emit the scattered light.

On the second substrate 370, the second electrode 352 may be installed, and various parts for controlling general operation of the display device 300 may also be installed. The various parts installed on the second substrate 370 may, for example, include e.g., a processor, which may be implemented with one or more semiconductor chips and associated parts. The processor mounted on the second substrate 370 may control power supply to the first and second electrodes 351 and 352 to enable the light output unit 364 to output light of certain colors.

An example of the display device 300 has thus far been described, but the display device 300 may further include other various parts selected by the designer. For example, parts such as a touch screen panel, a protective film, a reflecting plate, a polarization plate, etc., may further be included in the display device 300.

According to the example display assembly and display device using the same, a viewing angle of blue light may be widened by scattering the blue light wider, thereby improving color viewing angle properties and thus enabling a correct image to be viewed at various viewing angles.

Furthermore, since the luminance of red and green light is enhanced in accordance with the display assembly and display device using the same, the white balance may be improved and thus overall luminance of the display assembly and display device may be improved, by increasing a percentage of amounts of red and green light, which are otherwise relatively insufficient as compared to blue light.

Several examples have thus been described, but it will be understood that various modifications can be made without departing the scope of the disclosure. Thus, it will be apparent to those ordinary skilled in the art that the disclosure is not limited to the examples described, but can encompass not only the appended claims but the equivalents.

What is claimed is:

1. A display assembly comprising:
    a light source configured to output blue light;
    a quantum dot converter configured to convert the blue light output from the light source to output at least one of red light and/or green light;
    a light transmitter configured to transmit the blue light output from the light source by scattering all or part of the blue light; and
    a substrate on which the quantum dot converter and the light transmitter are arranged;
    wherein the quantum dot converter comprises:
    at least one red light quantum dot element configured to convert blue light output from the light source to red light and to output red light, wherein the at least one red light quantum dot element comprises a third output face from which red light is output;
    at least one green light quantum dot element configured to convert blue light output from the light source to green light and to output green light, wherein the at least one green light quantum dot element comprises a fourth output face from which green light is output; and
    wherein at least one of an area of the third output face and an area of the fourth output face is greater than an area of a second output face of the light transmitter.

2. The display assembly of claim 1, wherein the quantum dot converter comprises a first output face from which at least one of red light and/or green light is output, wherein an area of the first output face is greater than an area of the second output face.

3. The display assembly of claim 1,
wherein the at least one red light quantum dot element, the at least one green light quantum dot element, and the light transmitter are arranged on the substrate in a predetermined pattern.

4. The display assembly of claim 3,
wherein the number of the at least one red light quantum dot element and/or the number of the at least one green light quantum dot element arranged on the substrate is greater than the number light transmitters arranged on the substrate.

5. The display assembly of claim 3,
wherein the substrate includes unit sections in which the at least one red light quantum dot element, the at least one green light quantum dot element, and the light transmitter are located.

6. The display assembly of claim 5,
wherein one unit section includes a plurality of sub-sections, and wherein the light transmitter is located in at least one of the sub-sections while at least one of the at least one red light quantum dot element and the at least one green light quantum dot element is located in the other sub-sections.

7. The display assembly of claim 6,
wherein at least one of the at least one red light quantum dot element and the at least one green light quantum dot element is located in more sub-sections than the light transmitter.

8. The display assembly of claim 1,
wherein the light source comprises multiple light sources, and the multiple light sources irradiate blue light toward the at least one red light quantum dot element, green light quantum dot element, and light transmitter, respectively.

9. The display assembly of claim 1,
further comprising: a light guide plate, on which light output from the light source is laterally incident and from which the incident light is output through an output face,
wherein light output from the light guide plate is incident upon the quantum dot converter and the light transmitter.

10. The display assembly of claim 1,
wherein the light source is installed to face the substrate on which the quantum dot converter and the light transmitter are arranged.

11. The display assembly of claim 1,
wherein the light transmitter comprises a main body comprising a light transmitting material, and at least one scattering particle arranged inside the main body and configured to scatter incident blue light.

12. The display assembly of claim 11,
wherein the at least one scattering particle comprises at least one of zinc oxide, titanium oxide, and silicon oxide.

13. The display assembly of claim 11,
wherein the light transmitting material comprises at least one of natural resins, synthetic resins, and glass.

14. A display device comprising:
a light source configured to output blue light; and
a quantum dot sheet on which at least one red light quantum dot element configured to convert the blue light to red light and to output red light, at least one green light quantum dot element configured to convert the blue light to green light and to output green light, and at least one light transmitter configured to transmit the blue light by scattering all or part of the blue light and outputting the scattered light are arranged;
wherein the quantum dot sheet comprises:
at least one red light quantum dot element configured to convert blue light output from the light source to red light and to output red light, wherein the at least one red light quantum dot element comprises a third output face from which red light is output; and
at least one green light quantum dot element configured to convert blue light output from the light source to green light and to output green light, wherein the at least one green light quantum dot element comprises a fourth output face from which green light is output and
wherein at least one of an area of the third output face and an area of the fourth output face is greater than an area of a second output face of the light transmitter.

15. The display device of claim 14,
wherein the number of the at least one red light quantum dot element and/or the number of the at least one green light quantum dot element is greater than the number of light transmitters arranged on the quantum dot sheed.

16. The display device of claim 14,
further comprising: a liquid crystal layer,
wherein the light source is arranged to face the quantum dot sheet with respect to the liquid crystal layer.

17. The display device of claim 14,
further comprising: a light guide plate, on which the blue light is laterally incident and from which the incident light is output through an output face,
wherein the light output through the output face is incident upon the quantum dot sheet.

18. A display device comprising:
a plurality of light sources configured to output blue light;
at least one red light quantum dot element installed to correspond to at least one first light source among the plurality of light sources configured to convert the blue light to red light and to output red light, wherein the at least one red light quantum dot element comprises a third output face from which red light is output;
at least one green light quantum dot element installed to correspond to at least one second light source among the plurality of light sources configured to convert the blue light to green light and to output green light, wherein the at least one green light quantum dot element comprising a fourth output face from which green light is output; and
at least one light transmitter installed to correspond to at least one third light source among the plurality of light sources configured to transmit blue light by scattering all or part of the blue light and outputting the scattered light, wherein the at least one light transmitter comprises a second output face from which blue light is output,
wherein at least one of an area of the third output face and an area of the fourth output face is greater than an area of the second output face.

19. The display device of claim 18,
wherein an output face of at least one of the at least one red light quantum dot element and the at least one green light quantum dot element is larger than an output face of the at least one light transmitter.

20. The display device of claim 18,
wherein the number of at least one of the at least one red light quantum dot element and the number of at least one green light quantum dot element is greater than the number of the light transmitter.

\* \* \* \* \*